United States Patent
Chatterjee

(10) Patent No.: US 10,772,147 B2
(45) Date of Patent: Sep. 8, 2020

(54) METHODS AND APPARATUS FOR CONNECTION ATTEMPT FAILURE AVOIDANCE WITH A WIRELESS NETWORK

(71) Applicant: Intel Corporation, Santa Clara, CA (US)

(72) Inventor: Dibyendu Chatterjee, Bangalore (IN)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 15/388,590

(22) Filed: Dec. 22, 2016

(65) Prior Publication Data

US 2018/0184465 A1 Jun. 28, 2018

(51) Int. Cl.
| | |
|---|---|
| H04W 76/19 | (2018.01) |
| H04W 76/18 | (2018.01) |
| H04L 12/24 | (2006.01) |
| G01C 21/12 | (2006.01) |
| H04W 64/00 | (2009.01) |
| H04L 12/26 | (2006.01) |

(52) U.S. Cl.
CPC ......... *H04W 76/19* (2018.02); *H04L 41/0618* (2013.01); *H04W 76/18* (2018.02); *G01C 21/12* (2013.01); *H04L 43/0811* (2013.01); *H04W 64/00* (2013.01)

(58) Field of Classification Search
None
See application file for complete search history.

(56) References Cited

U.S. PATENT DOCUMENTS

| | | | | |
|---|---|---|---|---|
| 6,477,373 B1* | 11/2002 | Rappaport | ........ | H04W 36/0079 |
| | | | | 455/436 |
| 7,194,275 B2* | 3/2007 | Bolin | .................... | H04W 64/00 |
| | | | | 455/456.1 |
| 7,925,740 B2 | 4/2011 | Nath et al. | | |

(Continued)

FOREIGN PATENT DOCUMENTS

| | | |
|---|---|---|
| WO | 2004025900 | 3/2004 |
| WO | 201811301 | 6/2018 |

OTHER PUBLICATIONS

International Searching Authority, "International Search Report," issued in connection with International Patent Application No. PCT/US2017/062342, dated Mar. 12, 2018, 3 pages.

(Continued)

*Primary Examiner* — Christopher T Wyllie
(74) *Attorney, Agent, or Firm* — Hanley, Flight & Zimmerman, LLC

(57) ABSTRACT

Methods, apparatus, systems and articles of manufacture to attempt to establish a connection with a wireless network are disclosed. An example method includes determining a location of a field device. A frequency at which retry attempts to establish a connection with a wireless network are to be made is determined based on the location of the field device. Establishing the connection with the wireless network is attempted. In response to a failure to establish the connection with the wireless network, an indication of the failure to establish the connection and the location of the field device is stored, and the field device waits an amount of time based on the frequency.

24 Claims, 14 Drawing Sheets

(56) References Cited

U.S. PATENT DOCUMENTS

| | | | |
|---|---|---|---|
| 8,380,999 B1* | 2/2013 | Robison | H04W 52/0261 |
| | | | 713/300 |
| 8,385,943 B1 | 2/2013 | Han et al. | |
| 9,104,543 B1 | 8/2015 | Cavanagh et al. | |
| 2002/0065071 A1* | 5/2002 | Hunzinger | H04W 76/19 |
| | | | 455/421 |
| 2003/0040318 A1* | 2/2003 | Fattouch | H04W 16/18 |
| | | | 455/446 |
| 2003/0153338 A1* | 8/2003 | Herz | H04W 4/029 |
| | | | 455/517 |
| 2004/0198386 A1* | 10/2004 | Dupray | H04W 64/00 |
| | | | 455/456.1 |
| 2006/0187017 A1* | 8/2006 | Kulesz | G08B 21/12 |
| | | | 340/506 |
| 2006/0270421 A1* | 11/2006 | Phillips | G08B 21/0272 |
| | | | 455/457 |
| 2007/0265734 A1* | 11/2007 | Clark | G08G 1/0962 |
| | | | 701/1 |
| 2007/0299794 A1* | 12/2007 | El-Damhougy | H04W 40/246 |
| | | | 706/15 |
| 2008/0032713 A1* | 2/2008 | Yang | H04W 68/04 |
| | | | 455/458 |
| 2009/0005070 A1* | 1/2009 | Forstall | G01C 21/12 |
| | | | 455/456.1 |
| 2009/0190696 A1 | 7/2009 | Provencher | |
| 2009/0191892 A1* | 7/2009 | Kelley | H04W 48/20 |
| | | | 455/456.1 |
| 2011/0080825 A1* | 4/2011 | Dimou | H04W 36/30 |
| | | | 370/216 |
| 2011/0102149 A1* | 5/2011 | Lin | G06F 3/012 |
| | | | 340/10.1 |
| 2012/0034917 A1 | 2/2012 | Kazmi | |
| 2012/0309371 A1* | 12/2012 | Yamada | H04W 88/08 |
| | | | 455/414.2 |
| 2012/0326891 A1* | 12/2012 | Cross | G08G 1/082 |
| | | | 340/906 |
| 2013/0159552 A1* | 6/2013 | Xiang | H04L 69/40 |
| | | | 709/246 |
| 2015/0156640 A1* | 6/2015 | Nguyen | H04W 16/18 |
| | | | 455/422.1 |
| 2016/0034359 A1* | 2/2016 | Cabrera | G06F 11/1464 |
| | | | 714/19 |
| 2017/0142654 A1* | 5/2017 | McLaughlin | H04W 52/0216 |
| 2017/0339011 A1* | 11/2017 | Condeixa | H04W 4/70 |
| 2017/0339548 A1* | 11/2017 | Moriya | H04W 8/005 |
| 2017/0374493 A1* | 12/2017 | Pereira Cabral | H04W 4/70 |
| 2018/0072223 A1* | 3/2018 | Arunachalam | H04W 4/90 |
| 2018/0074156 A1* | 3/2018 | Arunachalam | B60Q 9/008 |

OTHER PUBLICATIONS

International Searching Authority, "Written Opinion of the International Searching Authority," issued in connection with International Patent Application No. PCT/US2017/062342, dated Mar. 12, 2018, 7 pages.

* cited by examiner

| ZONE | CONNECTION PROBABILITY |
|------|------------------------|
| O | 90% |
| P | 50% |
| R | 90% |
| S | 10% |
| T | 10% |
| W | 90% |
| X | 10% |

METHODS AND APPARATUS FOR CONNECTION ATTEMPT FAILURE AVOIDANCE WITH A WIRELESS NETWORK

FIELD OF THE DISCLOSURE

This disclosure relates generally to wireless communications, and, more particularly, to methods and apparatus for connection attempt failure avoidance with a wireless network.

BACKGROUND

Asset tracking systems sometimes utilize devices that report their location to a central asset tracking system. Asset tracking systems such as, for example, vehicle telemetry systems, construction telemetry, wildlife tracking, parcel delivery tracking, etc. rely on such tracking devices operating in the field for extended periods of times (e.g., months, years, etc.) Ensuring that stored power resources are used efficiently and are not wasted is important.

BRIEF DESCRIPTION OF THE DRAWINGS

FIG. 7 is an example tabular representation of the probability map provided by the example coverage data processor of FIGS. 1 and/or 4 to the example field device of FIGS. 1 and/or 3.

The figures are not to scale. Wherever possible, the same reference numbers will be used throughout the drawing(s) and accompanying written description to refer to the same or like parts.

DETAILED DESCRIPTION

Figure 1:
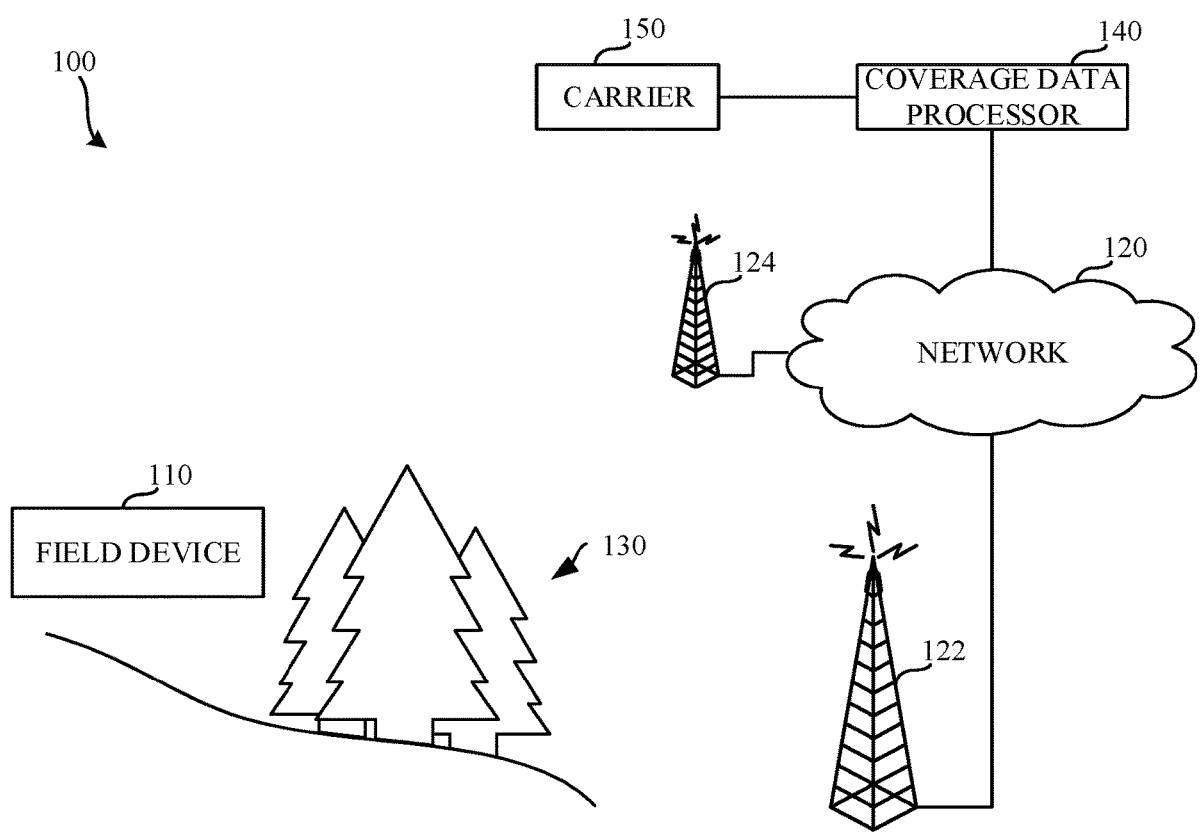
FIG. 1 represents an example environment of use in which a field device communicates with a network via one or more wireless access points.

Asset tracking systems sometimes utilize devices that report their location to a central asset tracking system. Asset tracking systems such as, for example, vehicle telemetry systems, construction telemetry systems, wildlife tracking systems, parcel delivery tracking systems, etc. rely on such tracking devices operating in the field for extended periods of times (e.g., months, years, etc.). When operating in the field, such devices might not always be located in an area where wireless (e.g., cellular) connectivity is available. Power stored in a battery of the device is used heavily when the device attempts to connect to a wireless network. Reducing the amount of times that a device attempts to connect to the wireless network likewise reduces a power drain on the device, thereby extending the useful life of the device in the field. Moreover, frequent connection attempts can cause excessive heating of the device, which can pose other hazards and/or safety concerns.

Some known approaches to reducing the frequency of connection attempts utilize timing heuristics to increase and or decrease the frequency at which connection attempts are performed. For example, a connection may be attempted once every second and, after a threshold number of failures, the frequency may be decreased to once every ten seconds. However, such systems suffer from a lack of a-priori knowledge and, as a result, many connection attempts are performed in locations where the device will not be able to establish a connection.

In examples disclosed herein, a location aware approach is combined with a probability map to determine a frequency at which connection retry attempts should be performed. A device retrieves a probability map indicating probabilities that the device will be able to establish a wireless connection with a wireless network (e.g., a cellular network) from a coverage data processor. In some examples, the probability map represents connectivity probabilities across an entire geographic region (e.g., a city, a state, a nation, etc.) in which the device is expected to be operated. While operating in the field, a present location of the device is determined by the device, and a lookup is performed by the device to identify the corresponding connectivity probability for that location. Using the connectivity probability, the device computes a frequency at which connection retries should be attempted. The device attempts to establish a connection and, in the event of a failure, logs the failed attempt and waits an amount of time corresponding to the retry frequency.

Upon establishing a connection, the device transmits its current location and the log of the failed attempts to the coverage data processor. The coverage data processor uses the indication of the established connection and the log of the failed connection attempts to update the probability map. In practice, many devices will report their indications of established connections and logs of failed attempts. Thus, the coverage data processor can utilize many connection establishment indications and logs of failed attempts received from many different devices to update the probability map. The probability map can then be distributed back to those devices which then utilize updated probability information based on real-world reports of whether other devices were able to establish a connection in a given area.

FIG. 1 represents an example environment of use 100 in which a field device 110 communicates with a network 120 via one or more wireless access points 122, 124. In the illustrated example of FIG. 1, the example environment of use 100 includes obstructions 130 intermediate the field device 110 and the wireless access points 122, 124. In the illustrated example of FIG. 1, the example field device 110 communicates with a coverage data processor 140 via the network 120. The example coverage data processor 140 provides a coverage probability map(s) to the field device 110 to enable the field device to determine a frequency at which retry attempts to connect to the network 120 are to be made. In examples disclosed herein, the coverage data processor 140 initializes such coverage probability map(s) using coverage information provided by a carrier 150. In examples disclosed herein, the carrier 150 operates the wireless access points 122, 124 and/or components of the network 120. The coverage information supplied by the carrier 150 is then updated based on reports from field device(s) 110 indicating wireless connection successes and/ or failures in locations in which they have been operating.

The example field device 110 of the illustrated example of FIG. 1 is a mobile device capable of communicating with the coverage data processor 140 via the wireless access points 122, 124. The example field device 110 is typically implemented as a low-powered device that includes location tracking functionality (e.g., a global positioning system) to report its location to an asset tracking system and/or the coverage data processor 140. However, any other type of field device 110 may additionally or alternatively be used such as, for example, a tablet (e.g., an iPad®), a smartphone, etc. In some examples, the field device 110 may be a laptop computer. In some examples, the example field device 110 may be an Internet of Things (IoT) device.

IoT is a concept in which a large number of computing devices (e.g., field devices) are interconnected to each other and to the Internet to provide functionality and data acquisition at very low levels. As used herein, an IoT device may include a semiautonomous device performing a function, such as sensing or control, among others, in communication with other IoT devices and a wider network, such as the Internet. Often, IoT devices are limited in memory, size, or functionality, allowing larger numbers to be deployed for a similar cost to smaller numbers of larger devices. In some examples, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data. The example network 120 of the illustrated example of FIG. 1 is a public network such as, for example, the Internet. However, in some examples, the network 120 may be implemented as a private area network such as, for example, a local area network (LAN), a virtual private network (VPN), etc. In the illustrated example of FIG. 1, the example network is a packet-switched network. However, any other type of network may additionally or alternatively be used such as, for example, a circuit switched network.

The example wireless access points 122, 124 of the illustrated example of FIG. 1 are cellular tower(s) that communicates with the field device 110 using a cellular protocol (e.g., Global System for Mobile Communications (GSM), Universal Mobile Telecommunications System (UMTS), Evolution-Data Optimized (EDVO), Enhanced Data rates for GSM Evolution (EDGE), Long Term Evolution (LTE), LTE-A, 5G, etc.). In some examples, other wireless communication protocols may additionally or alternatively be used such as, for example, Wi-Fi. In examples disclosed herein, the example wireless access points 122, 124 include a base station to enable the field device 110 to communicate with the network 120.

In the illustrated example of FIG. 1, two wireless access points 122, 124 are shown. However, in implementation, a telecommunications service provider (e.g., AT&T, Verizon, NTT DoCoMo, Vodaphone, Orange, etc.) will use many wireless access points 122, 124 to provide as large of a cellular coverage area as possible. However, installing wireless access points 122, 124 in locations where few or no users are expected to use the telecommunications services provided by the wireless access points 122, 124 is cost prohibitive. As a result, some areas serviced by such telecommunications services may exhibit reduced signal strength and/or a lower probability of being able to establish a wireless connection between the field device 110 and the wireless access points 122, 124 (e.g., locations where a signal strength between the field device 110 and the wireless access points 122, 124 is low enough that services are unreliable and/or of low quality).

The example obstructions 130 of the illustrated example of FIG. 1 are trees. However, any other type of obstructions may additionally or alternatively be used. For example, in the field, wireless connectivity between the field device 110 and the wireless access points 122, 124 may be obstructed by hills, vegetation, buildings, distance, etc. Example approaches disclosed herein enable the obstructions 130 present in a geographic area to be understood in connection with how such obstructions affect a probability of establishing a wireless connection between the field device 110 and the wireless access points 122, 124, and/or, more generally, a wireless network. Moreover, since such obstructions may change over time, in some examples, probability maps that are continually updated based on feedback received from field devices 110 are used to account for such changes.

The example coverage data processor 140 of the illustrated example of FIG. 1 is implemented by a server hosted by an entity providing location tracking services (e.g., an asset tracking system). However, any other entity may operate the coverage data processor 140 such as, for example, an entity providing telecommunication services (e.g., the carrier 150), etc. In examples disclosed herein, the example coverage data processor 140 collects information from the carrier 150 indicative of expected signal strength and/or probabilities of establishing a connection in a geographic region. The example coverage data processor 140 creates an initial probability map which is provided to field devices 110 that are to operate in that geographic region. The field devices 110 use such information to determine a frequency at which connections to the wireless network provided by the wireless access points 122, 124 should be attempted. The example field devices 110 provide feedback to the coverage data processor 140 to enable the coverage data processor 140 to update the probability maps based on real-world conditions in which the field devices 110 are operating.

While in examples disclosed herein, the coverage data processor 140 is described in connection with creating a probability map for a geographic region, the example coverage data processor 140 may create many different probability maps for many different regions. Moreover, in some examples, multiple probability maps may be created for a same region that are representative of different communication technologies available in that region. For example, the example coverage data processor 140 Main create and or maintain a first probability map corresponding to probabilities of establishing a wireless connection using 4G communication protocols, and the example coverage data processor 140 may create and/or maintain a second probability map corresponding to probabilities of establishing a wireless connection using 3G communication protocols in the same region. Probability maps may be created and/or maintained for any number of different communication protocols such as, for example, Global System for Mobile Communications (GSM), Universal Mobile Telecommunications System (UMTS), Evolution-Data Optimized (EDVO), Enhanced Data rates for GSM Evolution (EDGE), Long Term Evolution (LTE), WiFi, LTE-A, 5G, etc.

Additionally or alternatively, probability maps may be created for a same region that are different based on a time of day. For example, a geographic region near a heavily populated area might have a lower probability of establishing a connection during the day (e.g., when usage and/or congestion of the wireless network is high resulting from usage by other devices), while the same geographic region might have a higher probability of establishing the connection during the night (e.g., when usage and/or congestion of the wireless network is low). Moreover, probability maps may be created corresponding to any other time of day (e.g., one hour increments, four hour increments, etc.). In some examples, temporary probability maps may be created based on known events that might affect the probability of establishing the connection. For example, a sporting event occurring in a geographic region might be expected to draw a large amount of network traffic due to an increased number of users of the wireless network in the geographic region, thereby reducing the probability of establishing the connection during the sporting event.

The example carrier 150 of the illustrated example of FIG. 1 is a telecommunications service provider (e.g., AT&T, Verizon, NTT DoCoMo, Vodaphone, Orange, etc.). In examples disclosed herein, the example coverage data processor 140 interfaces and/or otherwise interacts with the carrier 150 to retrieve coverage information corresponding to the wireless network provided by the carrier 150. Traditionally, carriers 150 (e.g., telecommunications service providers) provide coverage maps to entice users to utilize their service over a competitor. Such coverage maps are useful, and that they provide a baseline of which the coverage data processor 140 can initialize probability maps for regions serviced by the carrier. However, as the coverage maps provided by the carriers 150 are traditionally part of marketing materials, such coverage maps may be skewed and/or otherwise be inaccurate with respect to the real-world conditions under which a field device 110 will be operating when attempting to connect to a wireless access point (e.g., the wireless access point 122, 124 serviced by the carrier 150). As noted above, to address this concern, the example coverage data processor 140 uses feedback received from the field devices 110 indicative of where connection failures and are connection successes occurred. In some examples, the coverage map is retrieved from an entity other than the carrier 150. For example, the coverage map may be retrieved and/or otherwise provided by a third party organization that monitors performance of wireless connectivity of the carriers such as, for example OpenSignal.

Figure 2:
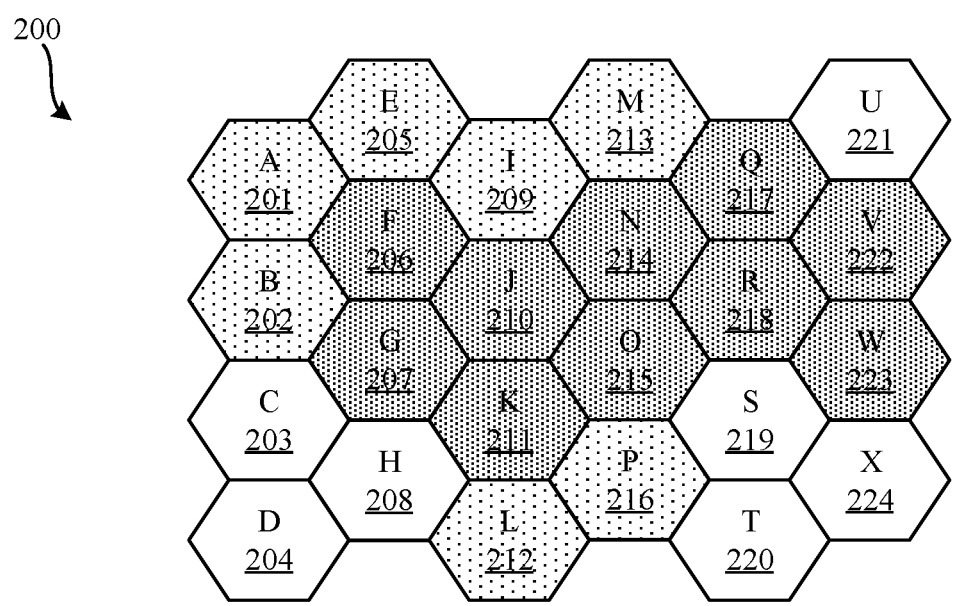
FIG. 2 is an example probability map indicative of probabilities of establishing a connection within a geographic region.

FIG. 2 is an example probability map 200 indicative of probabilities of establishing a connection within a geographic region. In the illustrated example of FIG. 2, the probability map 200 illustrates twenty-four coverage zones (e.g., zones A-X 201-224). In the illustrated example of FIG. 2, each of the 24 coverage zones 201-224 are represented as hexagonal shapes. However, any other shape may be used to indicate coverage probabilities within geographic region. In the illustrated example of FIG. 2, each zone represents an area of one square mile. However, each zone may represent any other size area (e.g., one acre, one half of a square mile, etc.). In the illustrated example of FIG. 2, each zone is the same size. However, in some examples, zones may be of different sizes.

In the illustrated example of FIG. 2 shading is used to represent a probability of which the field device should expect to be able to establish a wireless connection. In the illustrated example of FIG. 2, the darker shading of zone F 206, zone G 207, zone J 210, zone K 211, zone N 214, zone O 215, zone Q 217, zone R 218, zone V 222, and/or zone W 223 represent a high probability that the field device 110 will be able to establish a wireless connection when operating in those zones. in the illustrated example of FIG. 2, the medium shading of zone A 201, zone B 202, zone E 205, zone I 209, zone L 212, zone M 213, and/or zone P 216 represent a medium probability that the field device 110 will be able to establish a wireless connection when operating in those zones. In the illustrated example of FIG. 2, zones with no shading, such as zone C 203, zone D 204, zone H 208, zone S 219, zone T 220, zone U 221, and/or zone X 224, represent a low probability that the field device 110 will be able to establish a wireless connection when operating in those zones. While in the illustrated example of FIG. 2, high, medium, and low probabilities are shown, any other number of divisions of probabilities may additionally or alternatively be used. For example, probabilities may be represented by 10 levels of probability, 100 levels of probability, 1000 levels of probability, etc.

Figure 3:
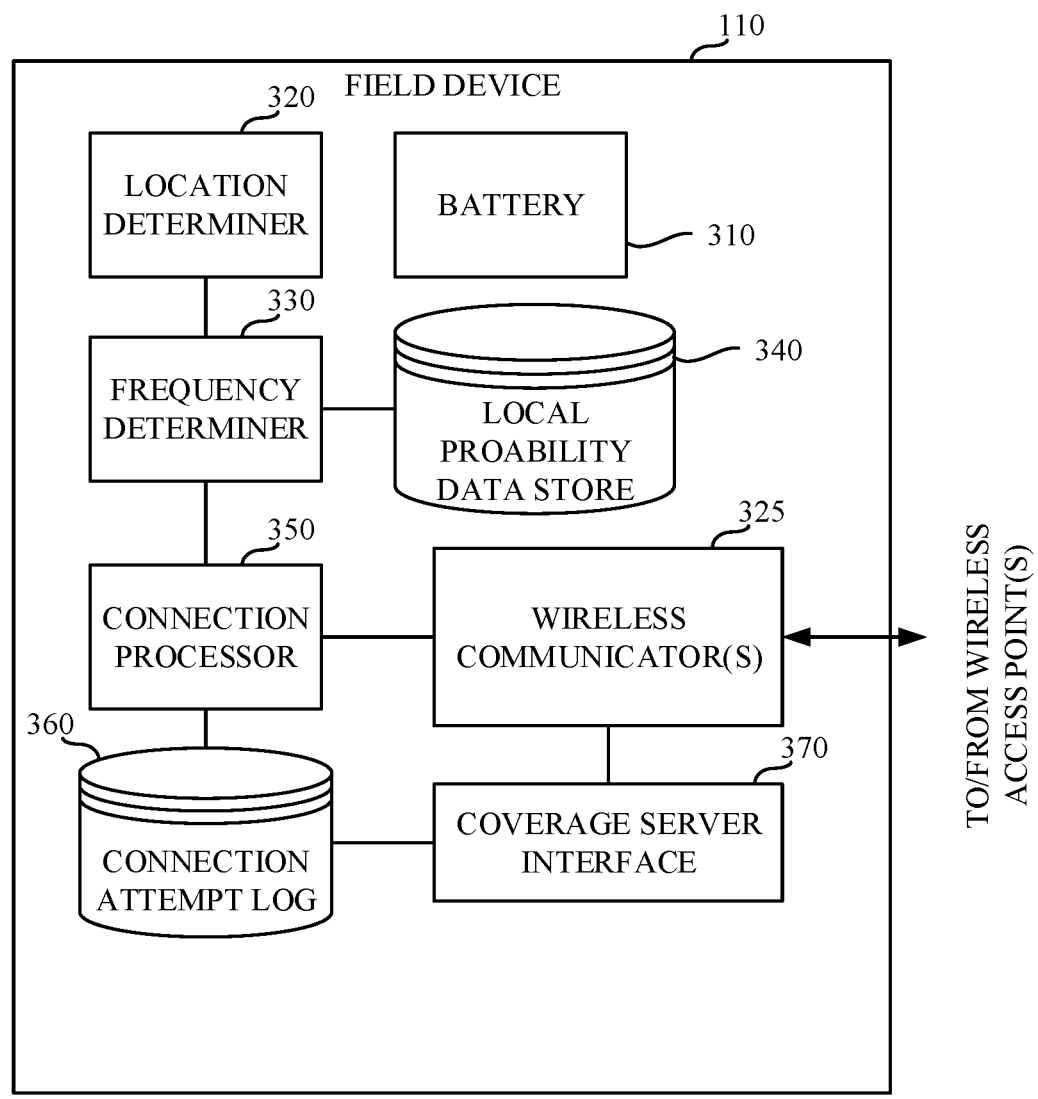
FIG. 3 is a block diagram representing an example implementation of the example field device of FIG. 1.

FIG. 3 is a block diagram representing an example implementation of the example field device 110 of FIG. 1. In the illustrated example of FIG. 3, the example field device includes a battery 310, a location determiner 320, one or more wireless communicator(s) 325, a frequency determiner 330, a local probability data store 340, a connection processor 350, a connection attempt log 360, and a coverage server interface 370.

The example battery 310 of the illustrated example of FIG. 3 is a rechargeable battery. However, any other past, present, and/or future type of energy storage device may additionally or alternatively be used. For example, the battery 310 may be a non-rechargeable battery (e.g., a battery that is to be replaced upon depletion). In examples disclosed herein, the field device 110 may be expected to operate in the field for weeks, months, etc. As such, the battery 310 of the illustrated example of FIG. 3 stores enough energy to power the field device 110 for the corresponding expected weeks, months, etc. of operation. In some examples, operations of the field device 110, such as attempting to establish a connection with the wireless access point 122, 124, drain energy stored in the battery 310. Some operations, such as failed attempts to establish a connection with the wireless access point 122, 124 consume energy stored in the battery 310 without completing their intended goal (e.g., establishing a connection with the wireless access point 122, 124). While such an operation is useful in that it is informative of the current state of the connectivity between the field device 110 and the wireless access point 122, 124, such operations should be avoided as they drain energy from the battery 310 without completing their intended goal (e.g., establishing a connection). Utilizing a probability map indicative of the likelihood of establishing a connection given the current location of the field device 110 enables the field device 110 to reduce the number of failed connection attempts and thereby reduce battery consumption. As a result, battery sizes may be reduced (thereby reducing the size of the field device), and/or expected periods of operation may be extended.

The example location determiner 320 of the illustrated example of FIG. 3 determines a location of the field device 110. In some examples, the example location determiner 320 also identifies a direction of gravel and a speed at which the field device 110 is moving. In the illustrated example of FIG. 3, the example location determiner 320 is implemented by a global positioning system (GPS) receiver. However, any other location determination system may additionally or alternatively be used. For example, the example location determiner 320 may utilize any past, present, and/or future location determination systems such as, for example, Galileo, Global Navigation Satellite System (GLONASS), cellular tower triangulation, assisted GPS, dead reckoning, inertial navigation systems, etc. Additionally or alternatively, hybrid systems utilizing two or more location determination systems (e.g., GPS and dead reckoning) may be used.

The example wireless communicator(s) 325 of the illustrated example of FIG. 3 enables wireless communication between the field device 110 and the wireless access points 122, 124. In the illustrated example of FIG. 3, the example wireless communicator(s) 325 communicates using a long term evolution (LTE) communication protocol. However, any other past, present, and/or future communication protocol and/or standards may additionally or alternatively be used. Moreover, in some examples, the wireless communicator 325 may utilize multiple communication technologies and/or protocols. In some examples, to allow for communication using multiple communication technologies and/or protocols, the example field device 110 may include multiple wireless communicators 325.

The example frequency determiner 330 of the illustrated example of FIG. 3 determines a frequency at which the field device 110 should attempt to establish a connection with the wireless access point 122, 124. The example frequency determiner 330 determines the frequency by accessing a current location of the field device 110 from the location determiner 320 and using the location to determine a probability of establishing a connection with the wireless access point 122, 124 given the current location of the field device 110. In examples disclosed herein, the example frequency determiner 330 converts the location provided by the location determiner 320 into a zone (e.g., a zone corresponding to one of the zones represented in FIG. 2). The zone is used to lookup the frequency for that zone as stored in the local probability data store 340. However, any other approach for determining the probability of establishing the connection based on the location of the field device 110 may additionally or alternatively be used.

The example frequency determiner 330 determines the frequency at which connection attempts should be made based on the probability of establishing the connection. In some examples, the example frequency determiner 330 performs a lookup of the frequency based on the probability. For example, Table 1, below, represents an example look-up table that may be stored in, for example, the local probability data store 340, to enable translation of a probability to a frequency at which connection attempts should be made.

TABLE 1

| Probability | Frequency |
| --- | --- |
| 76% to 100% | 120 attempts per hour |
| 51% to 75% | 60 attempts per hour |
| 26% to 50% | 6 attempts per hour |
| 0% to 25% | 1 attempt per hour |

The example Table 1, above, includes four probability ranges corresponding to approximately 25% probability increments. However, any other number of probability ranges may additionally or alternatively be used. While in the illustrated example of Table 1, the probability ranges are of approximately the same size (e.g., approximately 25%), probability ranges may be of any size.

In the illustrated example of Table 1, a probability of 76% or greater corresponds to a frequency of one hundred and twenty attempts per hour (two attempts per minute, or an attempt every thirty seconds). In the illustrated example of Table 1, a probability between 51% and 75% corresponds to a frequency of sixty attempts per hour (one attempt every minute). In the illustrated example of Table 1, a probability between 26% and 50% corresponds to a frequency of six attempts per hour (one attempt every ten minutes). In the illustrated example of Table 1, a probability of less than 25% corresponds to a frequency of 1 attempt per hour (an attempt every sixty minutes). While in the illustrated example of Table 1, the frequency is represented in a number of attempts per hour, any other representation may additionally or alternatively be used (e.g., a number of attempts per minute, a number of attempts per second, etc.) In some examples, instead of looking up a frequency at which attempts are to be made, the example frequency determiner 330 may determine an amount of time to wait in-between attempts. For example, the example frequency determiner 330 may identify that the field device 110 should wait 30 seconds in-between attempts when the probability of establishing a connection is greater than 75%.

In some examples, instead of performing a lookup to determine the frequency at which connection attempts are to be made, the example frequency determiner 330 may calculate the frequency based on the probability of establishing a connection. For example, the example frequency determiner 330 may utilize Equation 1, below, to determine the frequency at which connection attempts are to be made.

$$\text{Frequency} = \text{Scale} \times \text{Probability} \quad \text{Equation 1}$$

In the example Equation 1, above, Frequency represents the frequency at which connection attempts are to be made (in number of attempts per hour), Probability represents the probability of establishing a connection given the current location of the field device 110, and Scale is a scaling factor that enables conversion of the probability into the frequency. In some examples, a scaling factor of 1.2 may be used to convert a probability of 100% into a frequency of 120 attempts per hour. However, any other scaling factor may additionally or alternatively be used. While Equation 1 represents a linear relationship between probability and frequency, any other equation may additionally or alternatively be used such as, for example, a logarithmic equation, a polynomial equation, a piece-wise equation, etc.

The example local probability data store 340 of the illustrated example of FIG. 3 is used to store the probability of establishing a connection given the location of the field device 110. An example table representative of the example probabilities is described below in connection with FIG. 7. In some examples, the example local probability data store 340 stores the example probability to frequency lookup table described in Table 1, above. In the illustrated example of FIG. 3, the example local probability data store 340 stores data in a comma delimited format. However, any other past, present, and/or future approach to storing location information may additionally or alternatively be used such as, for example, an extensible markup language (XML) format, a tab delimited format, a structured query language (SQL) format, etc.

The example connection processor 350 of the illustrated example of FIG. 3 controls the wireless communicator(s) 325 to attempt to establish a connection with the wireless access points 122, 124. In the event of a connection failure, the example connection processor 350 records the failure in the connection attempt log 360. In some examples, the example connection processor 350 additionally records connection successes in the connection attempt log 360. In some examples, connection successes are note recorded, as the connection success is assumed upon establishing a connection. In some examples, upon establishing a connection, the connection attempt log 360 is transmitted to the coverage data processor 140. In such an example, the coverage data processor 140 may assume that (since a connection attempt log 360 is being received), the field device 110 successfully established a connection at the current location of the field device 110.

The example connection attempt log 360 of the illustrated example of FIG. 3 stores connection attempt failure and/or success information. In the illustrated example of FIG. 3, the example connection attempt log 360 store a location of the field device 110 when the attempt was made and a timestamp corresponding to when the connection attempt occurred. In some examples, the example connection attempt log 360 stores an indication of whether the connection was successfully established (or failed). In some examples, the location of the field device 110 when the attempt was made is stored using location coordinates (e.g., GPS coordinates). However, in some examples, the location of the field device 110 may additionally or alternatively be stored as a zone indicator (e.g., zone A, zone B, zone C, etc.) In some examples, the example connection attempt log 360 stores the frequency at which connections were to be attempted. In the illustrated example of FIG. 3, data is stored in the connection attempt log 360 in a comma separated format. However, any other past, present, and/or future approach to storing information may additionally or alternatively be used such as, for example, an extensible markup language (XML) format, a tab delimited format, a structured query language (SQL) format, etc.

The example coverage server interface 370 of the illustrated example of FIG. 3 retrieves the probability map for an expected region of operation of the field device 110 from the coverage data processor 140. In some examples, the example coverage server interface 370 transmits information stored in the connection attempt log 360 to the coverage data processor 140. The information transmitted to the coverage data processor 140 enables the coverage data processor 140 to modify the probability map provided to the field device 110 (and/or other field devices) such that the probabilities of establishing a connection in a given location are updated based on real-world conditions experienced by the field device 110 (and/or other field devices). In the illustrated example of FIG. 3, the example coverage server interface 370 communicates with the coverage data processor 140 using a hypertext transfer protocol (HTTP). However, any other communication protocol(s) and/or format(s) may additionally or alternatively be used for communicating with the example coverage data processor 140.

Figure 4:
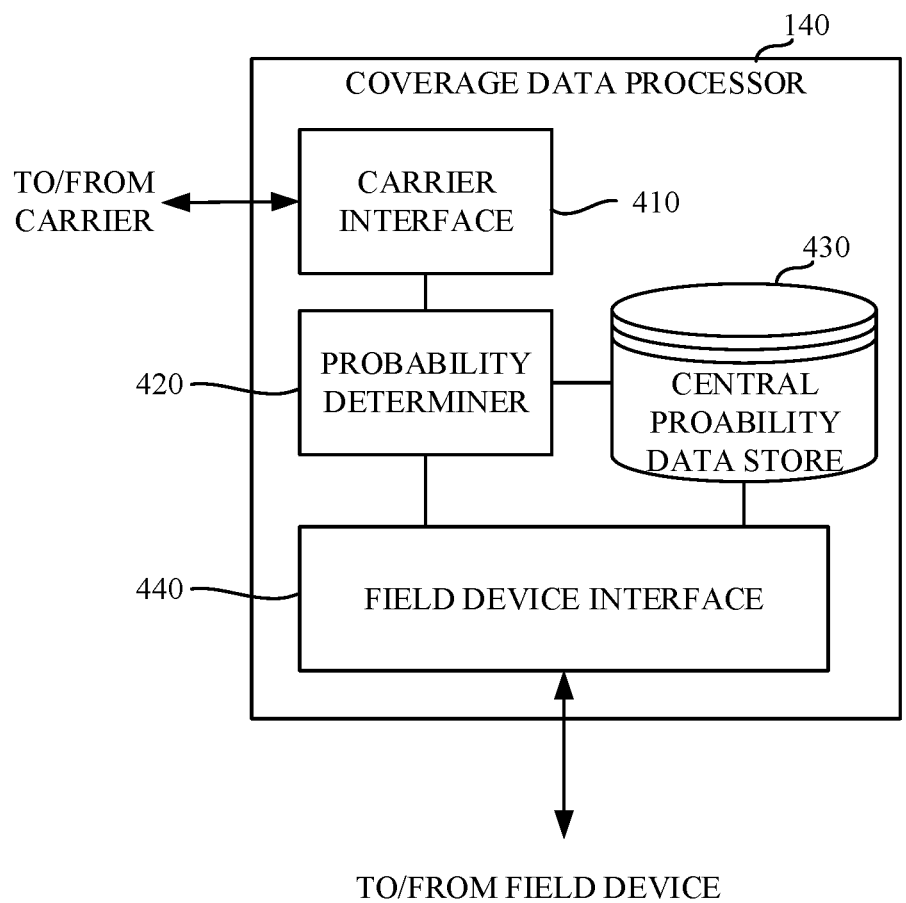
FIG. 4 is a block diagram representing an example implementation of the example coverage data processor of FIG. 1.

FIG. 4 is a block diagram representing an example implementation of the example coverage data processor 140 of FIG. 1. The example coverage data processor 140 of the illustrated example of FIG. 4 includes a carrier interface 410, a probability determiner 420, a central probability data store 430, and a field device interface 440.

The example carrier interface 410 of the illustrated example of FIG. 4 accesses a coverage map provided by the carrier 150 (and/or another third party providing a coverage map). The example carrier interface 410 provides the coverage map to the probability determiner 420 such that the probability determiner 420 can initialize the central probability data store 430 with probabilities of establishing a connection at different locations within a region based on information provided by the carrier 150 (e.g., an entity operating the wireless access point 122, 124) and/or any other third party entity (e.g., a third party entity measuring performance of the carrier 150).

The example probability determiner 420 of the illustrated example of FIG. 4 initializes the central probability data store 430 with probability data determined from the coverage map accessed via the carrier interface 410. In some examples, the example probability determiner 420 converts the coverage map accessed via the carrier interface 410 into zones (corresponding to the zones of FIG. 2) and determines, for each zone, a percentage of the zone in which the coverage map indicates that there is wireless coverage. The example probability determiner 420 stores the percentage of each zone as the probability of establishing a connection within that zone.

The example probability determiner 420 also receives connection logs indicative of connection successes and/or failures from field devices. The example probability determiner 420 modifies the probabilities of establishing a connection within a given zone based on the connection logs. In the illustrated example of FIG. 4, the example probability determiner 420 aggregates connection logs received from multiple field devices and evaluates a number of connection successes and/or failures reported from the field devices within each zone. In some examples, the example probability determiner 420 filters the aggregated connection logs to reflect connection successes and/or failures that occurred within a threshold period of time (e.g., the last month, the last week, etc.). Filtering to only the most recent connection successes and/or failures enables the probability for a zone to change over time and, accordingly, reflect changing conditions within a zone (e.g., new and/or upgraded wireless access points being installed to provide better coverage, changing obstructions, etc.). In the illustrated example of FIG. 4, the probability is calculated by dividing the number of connection successes within a zone by the total number of attempts within the zone. However, any other approach to determining the probability of establishing a connection within a zone may additionally or alternatively be used. For example, a machine learning algorithm may be used to adjust the probability of establishing a connection within a zone may be used.

The example central probability data store 430 of the illustrated example of FIG. 4 stores probabilities of establishing a connection by zone. In examples disclosed herein, the central probability data store 430 reflects probabilities of establishing a connection within zones that are within a region (e.g., within California, within the south-western United States of America, within the United States of America, within North America, etc.). However, in some examples, the central probability data store 430 may store probabilities of establishing a connection within zones of multiple regions. In the illustrated example of FIG. 4, the example central probability data store 430 stores data in a structured query language (SQL) format. However, any other past, present, and/or future approach to storing location information may additionally or alternatively be used such as, for example, an extensible markup language (XML) format, a tab delimited format, a comma separated format, etc.

The example field device interface 440 of the illustrated example of FIG. 4 interacts with the field device 110 to provide the probability map for a region in which the field device 110 is expected to operate and/or to receive connection logs from the field device 110. In examples disclosed herein, the example field device interface 440 is implemented using an HTTP interface (e.g., a web server). However, any other past, present, and/or future approach to implementing an interface with field devices may additionally or alternatively be used. In the illustrated example of FIG. 4, the example field device 440 provides connection logs received from the field device 110 to the probability determiner 420 to enable the probability determiner 420 to update the probabilities stored in the central probability data store 430 based on real-world conditions experienced (and reported) by the field devices.

While an example manner of implementing the example field device 110 of FIG. 1 is illustrated in FIG. 3 and an example manner of implementing the example coverage data processor 140 of FIG. 1 is illustrated in FIG. 4, one or more of the elements, processes and/or devices illustrated in FIGS. 1, 3, and/or 4 may be combined, divided, re-arranged, omitted, eliminated and/or implemented in any other way. Further, the example location determiner 320, the example wireless communicator(s) 325, the example frequency determiner 330, the example connection processor 350, the example coverage server interface 370, and/or, more generally, the example field device 110 of FIGS. 1 and/or 3, and/or the example carrier interface 410, the example probability determiner 420, the example field device interface 440, and/or, more generally, the example coverage data processor 140 of FIGS. 1 and/or 4 may be implemented by hardware, software, firmware and/or any combination of hardware, software and/or firmware. Thus, for example, any of the example location determiner 320, the example wireless communicator(s) 325, the example frequency determiner 330, the example connection processor 350, the example coverage server interface 370, and/or, more generally, the example field device 110 of FIGS. 1 and/or 3, and/or the example carrier interface 410, the example probability determiner 420, the example field device interface 440, and/or, more generally, the example coverage data processor 140 of FIGS. 1 and/or 4 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s))). When reading any of the apparatus or system claims of this patent to cover a purely software and/or firmware implementation, at least one of the example location determiner 320, the example wireless communicator(s) 325, the example frequency determiner 330, the example connection processor 350, the example coverage server interface 370, and/or, more generally, the example field device 110 of FIGS. 1 and/or 3, and/or the example carrier interface 410, the example probability determiner 420, the example field device interface 440, and/or, more generally, the example coverage data processor 140 of FIGS. 1 and/or 4 is/are hereby expressly defined to include a tangible computer readable storage device or storage disk such as a memory, a digital versatile disk (DVD), a compact disk (CD), a Blu-ray disk, etc. storing the software and/or firmware. Further still, the example field device 110 of FIGS. 1 and/or 3, and/or the example coverage data processor of FIGS. 1 and/or 4 may include one or more elements, processes and/or devices in addition to, or instead of, those illustrated in FIGS. 1, 3, and/or 4, and/or may include more than one of any or all of the illustrated elements, processes and devices.

Figure 5:
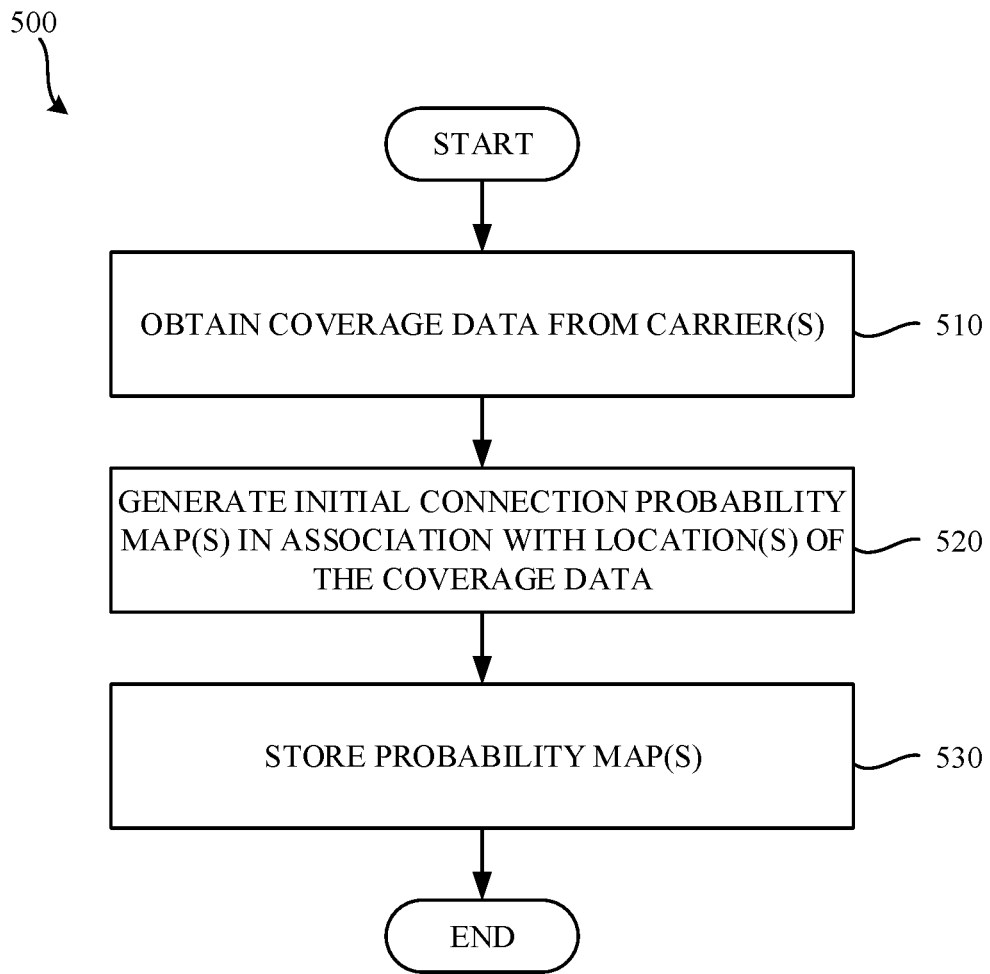
FIG. 5 is a flowchart representative of example machine-readable instructions which, when executed, cause the coverage data processor of FIGS. 1 and/or 4 to initialize probability map(s) based on carrier-provided coverage data.
Figure 6:
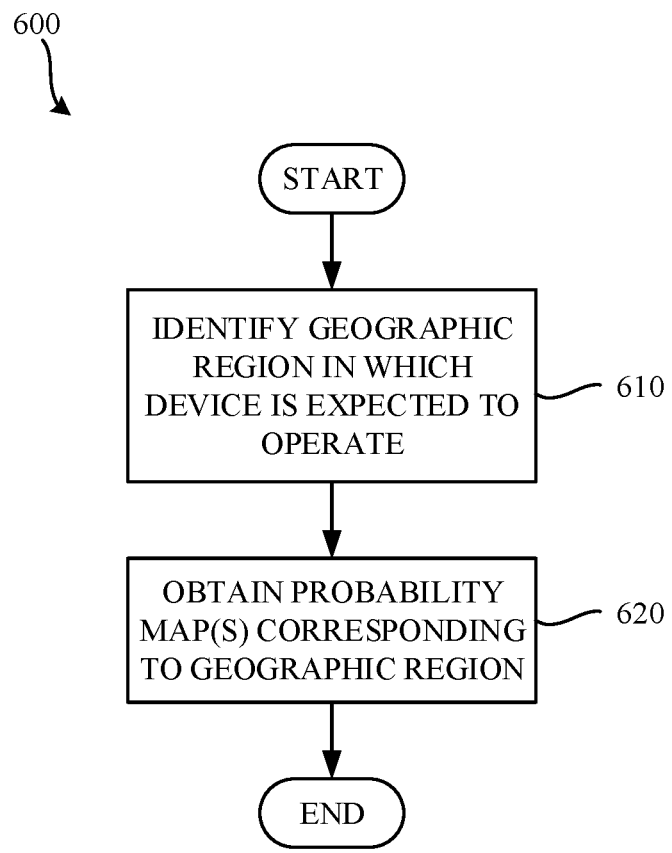
FIG. 6 is a flowchart representative of example machine-readable instructions which, when executed, cause the example field device of FIGS. 1 and/or 3 to gather probability map(s) from the example coverage data processor of FIGS. 1 and/or 4.
Figure 8:
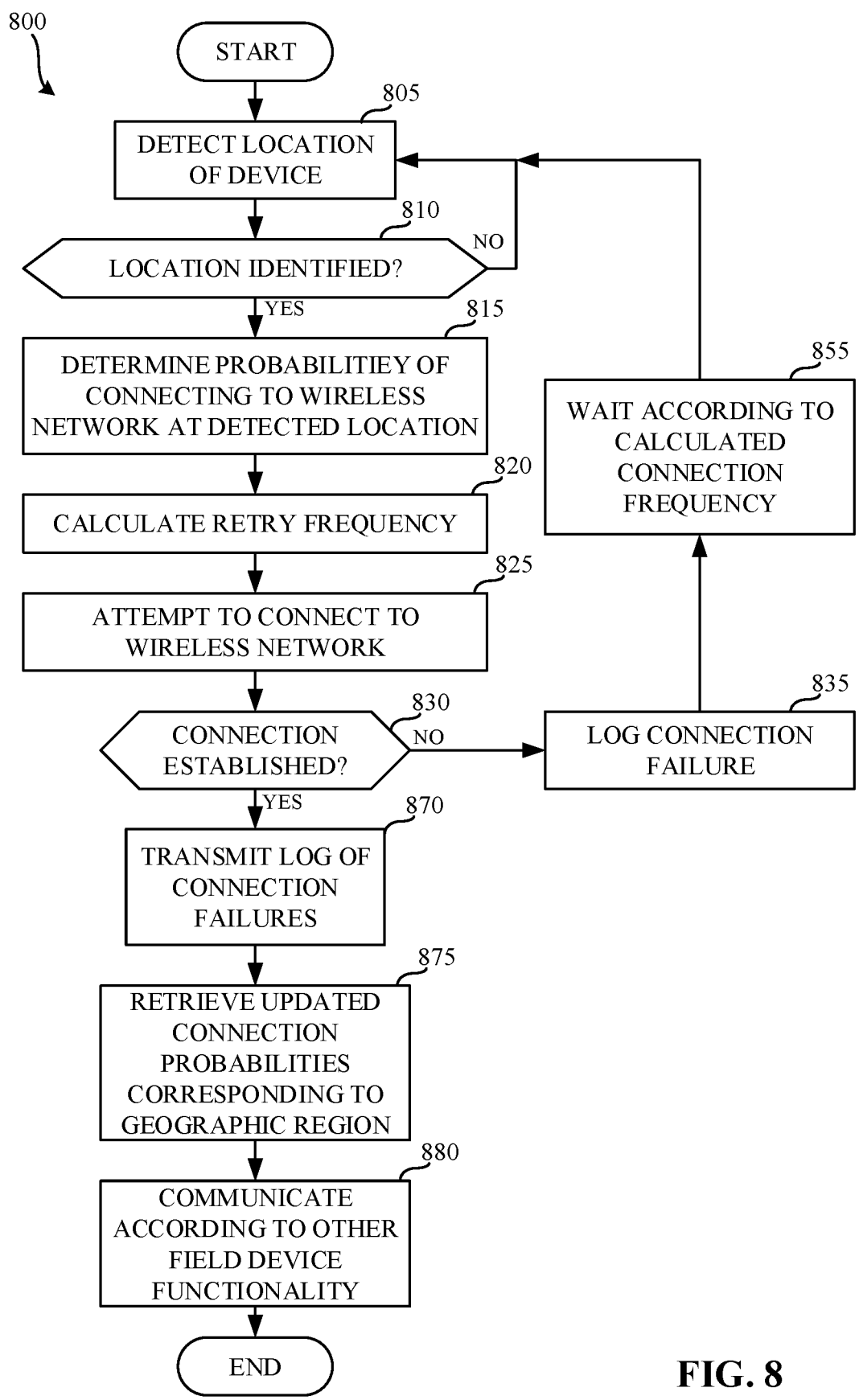
FIG. 8 is a flowchart representative of example machine-readable instructions which, when executed, cause the example field device of FIGS. 1 and/or 3 to attempt to establish a connection and report connection failures to the coverage data processor of FIG. 1.

Flowcharts representative of example machine readable instructions for implementing the example field device 110 of FIGS. 1 and/or 3 are shown in FIGS. 6, 8, and/or 9. Flowchart representative of example machine readable instructions for implementing the example coverage data processor 140 of FIGS. 1 and/or 4 are shown in FIGS. 5 and/or 11. In these examples, the machine readable instructions comprise a program(s) for execution by a processor such as the example processor 1212 shown in the example processor platform 1200 and/or the example processor 1312 shown in the example processor platform 1300 discussed below in connection with FIGS. 12 and/or 13. The program(s) may be embodied in software stored on a tangible computer readable storage medium such as a CD-ROM, a floppy disk, a hard drive, a digital versatile disk (DVD), a Blu-ray disk, or a memory associated with the processor(s) 1212, 1312, but the entire program and/or parts thereof could alternatively be executed by a device other than the processor(s) 1212, 1312 and/or embodied in firmware or dedicated hardware. Further, although the example program is described with reference to the flowcharts illustrated in FIGS. 5, 6, 8, 9, and/or 11, many other methods of implementing the example field device 110 and/or the example coverage data processor 140 may alternatively be used. For example, the order of execution of the blocks may be changed, and/or some of the blocks described may be changed, eliminated, or combined.

As mentioned above, the example processes of FIGS. 5, 6, 8, 9, and/or 11 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5, 6, 8, 9, and/or 11 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 5 is a flowchart representative of example machine-readable instructions which, when executed, cause the coverage data processor 140 of FIGS. 1 and/or 4 to initialize probability map(s) based on carrier-provided coverage data. The program 500 of FIG. 5 begins at block 510 when the example carrier interface 410 accesses coverage data from the carrier 150. In the illustrated example of FIG. 5, the coverage map provided by the carrier 150 (and/or another third party providing a coverage map) without the coverage data processor 140 having requested the coverage map. However, the coverage map may be requested from the carrier 150 and/or accessed in any other fashion. In the illustrated example of FIG. 5, the coverage map is a map that indicates areas where the carrier 150 (and/or the wireless access points 122, 124 operated by the carrier 150) provides wireless coverage. However, any other type of coverage map and/or indication of where the carrier 150 provides coverage may additionally or alternatively be used.

In the illustrated example of FIG. 5, the example probability determiner 420 generates initial connection probability maps in association with zones represented in the coverage data (block 520). In some examples, the example probability determiner 420 converts the coverage map into zones (e.g., zones corresponding to the zones of FIG. 2) and determines, for each zone, a percentage of the zone in which the coverage map indicates that there is wireless coverage as the probability of establishing a connection for that zone. However, any other approach to determining an initial connection probability may additionally or alternatively be used. The example probability determiner 420 stores the percentage of each zone as the probability of establishing a connection within that zone in the central probability data store 430 (block 530). The example process 500 of FIG. 5 then terminates. In some examples, the example process 500 of FIG. 5 may be repeated upon receipt of a new coverage map provided by the carrier 150. In some examples, coverage maps from multiple carriers may be combined to account for multiple providers servicing an area. In some examples, multiple probability maps may be created to account for different wireless technologies and/or carriers in use in a zone.

FIG. 6 is a flowchart representative of example machine-readable instructions 600 which, when executed, cause the example field device 110 of FIGS. 1 and/or 3 to gather probability map(s) from the example coverage data processor 140 of FIGS. 1 and/or 4. The program 600 of FIG. 6 begins at block 610 when the example coverage server interface 370 determines a geographic region in which the field device 110 is expected to operate (block 610). In the illustrated example of FIG. 6, the example coverage server interface 370 interacts with the location determiner 320 to determine a current location of the field device 110 and selects a region (e.g., a city, a state, a nation, etc.) in which the field device 110 is currently located. The example coverage server interface 370 transmits a request to the coverage data processor 140 to obtain one or more probability maps for the selected geographic region (block 620). The example coverage server interface 370 stores the retrieved probability map(s) in the example local probability data store 340. The example process 600 of FIG. 6 terminates.

In some examples, the example process 600 of FIG. 6 is repeated upon the field device 110 has entered (or is about to enter) a new region. Such an approach is useful for field devices 110 that are operating in the field in that they can automatically request coverage map(s) for the region in which they are currently operating. However, in some examples, the region in which the field device 110 is known ahead of time such that the region may be identified and the coverage map(s) may be stored in the local probability data store 340 before the field device 110 enters the field. Such an approach is useful because, prior to the field device 110 entering the field, the field device 110 may be operated using external power and/or a reliable wireless connection (e.g., during manufacture of the field device 110), thereby avoiding the need to retrieve the coverage map while the field device 110 is using energy stored in the battery 310 and/or communicating via potentially unreliable wireless connection (which may cause consumption of addition energy resources). As explained below in connection with FIG. 8, in some examples, the example coverage server interface 370 retrieves the probability map from the coverage data processor 140 when a connection is successfully established to ensure that the probability map stored in the example central probability data store 430 is as up to date as possible.

In some examples, the region in which the field device 110 is expected to operate is limited to as small of a region as possible (e.g., a few zones) to conserve and/or reduce memory space requirements of the example local probability data store 340. However, in some other examples, the region in which the field device 110 is expected to operate is a large region (e.g., a nation, a continent, etc.), to ensure that the field device 110 has enough coverage information available to determine the frequency at which connection attempts are to be made. In some examples, the coverage map stored in the local probability data store 340 is initialized with a coverage map(s) corresponding to a large region (e.g., where the field device 110 might potentially operate), and subsequently updated using coverage map(s) corresponding to a smaller region (e.g., where the field device 110 is actually operating). Such a combined approach minimizes the amount of data transmitted using the wireless communicator when the field device 110 is operating in the field, while still providing some coverage information for zones where the field device 110 is not presently located, but could be moved.

In some examples, the probability map retrieved by the example coverage server interface 370 is stored in the local probability data store 340 in a tabular format. FIG. 7 is an example tabular representation of the probability map 700 provided by the example coverage data processor 140 of FIGS. 1 and/or 4 to the example field device 110 of FIGS. 1 and/or 3. The example probability map 700 includes an example zone column 701 and an example connection probability column 703. The example zone column 701 identifies a zone (e.g., corresponding to a zone of FIG. 2). The example connection probability column 703 identifies the probability of establishing a wireless connection within the corresponding zone. While in the illustrated example of FIG. 7, zones are identified in the example zone column 701 by a letter, any other approach to identifying a geographic zone may additionally or alternatively be used such as, for example, a serial number, a set of geographical coordinates defining the zone, etc.

The example probability map 700 of the illustrated example of FIG. 7 includes a first example row 715, a second example row 716, a third example row 718, a fourth example row 719, a fifth example row 720, a sixth example row 723, and a seventh example row 724. While the example probability map 700 of the illustrated example of FIG. 7 includes seven example rows, in practice, the example probability map stored in the example local probability data store 340 will store many more rows corresponding to zones of the region in which the field device 110 is expected to operate.

In the illustrated example of FIG. 7, the first example row 715 corresponds to zone O (e.g., zone O 215 of FIG. 2), and has a 90% probability of establishing a wireless connection. In the illustrated example of FIG. 7, the second example row 716 corresponds to zone P (e.g., zone P 216 of FIG. 2), and has a 50% probability of establishing a wireless connection. In the illustrated example of FIG. 7, the third example row 718 corresponds to zone R (e.g., zone R 218 of FIG. 2), and has a 90% probability of establishing a wireless connection. In the illustrated example of FIG. 7, the fourth example row 719 corresponds to zone S (e.g., zone S 219 of FIG. 2), and has a 10% probability of establishing a wireless connection. In the illustrated example of FIG. 7, the fifth example row 720 corresponds to zone T (e.g., zone T 220 of FIG. 2), and has a 10% probability of establishing a wireless connection. In the illustrated example of FIG. 7, the sixth example row 723 corresponds to zone W (e.g., zone W 223 of FIG. 2), and has a 90% probability of establishing a wireless connection. In the illustrated example of FIG. 7, the seventh example row 724 corresponds to zone X (e.g., zone X 224 of FIG. 2), and has a 10% probability of establishing a wireless connection.

While in the illustrated example of FIG. 7, a single connection probability column 703 is shown in correspondence with each zone, in some examples, multiple connection probability columns corresponding to different wireless communication technologies may be stored. In some examples, separate probability maps are stored corresponding to each of the different wireless communication technologies.

FIG. 8 is a flowchart representative of example machine-readable instructions 800 which, when executed, cause the example field device 110 of FIGS. 1 and/or 3 to attempt to establish a connection and report connection failures to the coverage data processor 140 of FIG. 1. The program 800 of FIG. 8 begins at block 805 when the example location determiner 320 detects a current location of the field device 110 (block 805). In the illustrated example of FIG. 8, the example location determiner 320 determines the location using GPS. However, any other location detection system may additionally or alternatively be used such as, for example, dead reckoning, a terrestrial location system, an indoor location system, etc. The example frequency determiner 330 determines whether the example location determiner 320 determined the current location of the field device 110 (block 810). If no location is identified (block 810 returns a result of NO), the process of blocks 805 and 810 is repeated until a location is identified.

When the current location of the field device 110 is identified (block 810 returns a result of YES), the example frequency determiner 330 determines a probability of establishing a connection at the detected location (block 815). In the illustrated example of FIG. 8, the example frequency determiner 330 determines the probability by identifying a zone that includes the current location of the field device 110 and performing a lookup within the example local probability data store 340 based on the zone. For example, if the example frequency determiner 330 determined that the field device were located in zone S, the example frequency determiner 330 would retrieve a probability of 10% from the example local probability data store 340 (see the example fourth row 719 of FIG. 7 corresponding to zone S). Of course, any other probability may be determined based on the zone in which the field device 110 is currently located.

The example frequency determiner 330 determines the frequency at which connection attempts are to be retried based on the probability of establishing the connection (block 820). In some examples, the example frequency determiner 330 performs a lookup of the frequency based on the probability. For example, a table such as Table 1, described above described in connection with FIG. 3, may be used to enable the frequency determiner 330 to translate the probability of establishing the connection to the frequency at which retries are to be attempted. In some examples, instead of performing a lookup to determine the frequency at which connection attempts are to be made, the example frequency determiner 330 calculates the frequency based on the probability of establishing a connection. For example, the example frequency determiner 330 may utilize Equation 1, described above in connection with FIG. 3, to determine the frequency at which connection attempts are to be made. In some examples, the equation for calculating the retry frequency based on the probability is a linear equation. However any other type of equation may additionally or alternatively be used such as, for example, a logarithmic equation, a polynomial equation, a piece-wise equation, etc.

The example connection processor 350 directs the example wireless communicator(s) 325 to establish a connection (block 825). As the field device 110 is expected to be operated in locations where signal strength is low, the example wireless communicator(s) 325 may fail to establish the connection. The example connection processor 350 determines whether the example wireless communicator(s) 325 established the connection (block 830). If the example connection processor 350 determines that the example wireless communicator(s) 325 did not establish the connection, the example connection processor 350 logs (e.g., stores a record of) the connection failure in the connection attempt log 360 (block 835). In the illustrated example of FIG. 8, the example connection processor 350 stores the location of the field device 110 when the attempt was made, and a timestamp corresponding to when the connection attempt occurred. Storing the location and timestamp enables the coverage data processor 140 to adjust probabilities for a given zone based on recent connection attempts and/or failures. The example connection processor 350 then waits according to the calculated connection frequency (block 855). For example, if the calculated connection frequency were two attempts per minute, the example connection processor 350 waits thirty seconds before proceeding to block 805. The example process of blocks 805, 810, 815, 820, 825, 830, 835, and 855 is repeated until the example connection processor 350 determines that a connection was successfully established (until block 830 returns a result of YES).

Upon determining that a connection has been established (block 830 returning a result of YES), the example coverage server interface 370 transmits the log of connection failures stored in the example connection attempt log 360 to the coverage data processor 140 (block 870). In some examples, the example coverage server interface 370 does not transmit an explicit identification of a connection success. However, the example coverage data processor 140, by virtue of receiving the log of connection failures, implies that the example field device 110 was able to successfully establish a connection. In some examples, the example coverage server interface 370 does not transmit the log of connection failures upon every successful connection and, instead, waits until a threshold has been reached before triggering a transmission of the log of connection failures (e.g., a time-based threshold, a size based threshold, a number of records based threshold, a signal strength threshold, etc.) In such examples, the example connection processor 350 may additionally log successes, as the example coverage data processor 140 may not be able to later imply that a connection was successfully established in the past (e.g., if no communication was made to the coverage data processor 140).

The example coverage server interface 370 transmits a request to the coverage data processor 140 to retrieve an updated probability map for the selected geographic region (block 875). By requesting the updated probability map, real-world conditions experienced by other field devices that have operated in the region can be used to inform the field device 110 of the probability of establishing a connection given the current location of the field device 110.

While the example process 800 of the illustrated example of FIG. 8 is described in connection with a single probability map, in some examples, multiple probability maps corresponding to different communication technologies and/or different carriers may additionally or alternatively be used. To accommodate the multiple probabilities, probability map having the greatest probability of establishing a connection for the given location is used. For example, if in a first zone a first communication technology had a low probability while a second communication technology in the first zone, the second communication technology would be selected for attempting to establish a connection. However, any other approach to selecting a wireless communication technology may additionally or alternatively be used. For example, probabilities may be weighted based on an amount of energy expected to be consumed when attempting to establish a connection when using the corresponding wireless communication technology. Such an approach ensures that more energy efficient wireless communication technologies are preferred over less energy efficient wireless communication technologies.

The example field device 110 then communicates according to other field device functionality (block 880). For example, if the field device were an asset tracking system, the example field device 110 may report its current location to an asset tracking system. The example process 800 of FIG. 8 then terminates. The example process 800 of FIG. 8 may be repeated in response to, for example, a connection failure.

Figure 9:
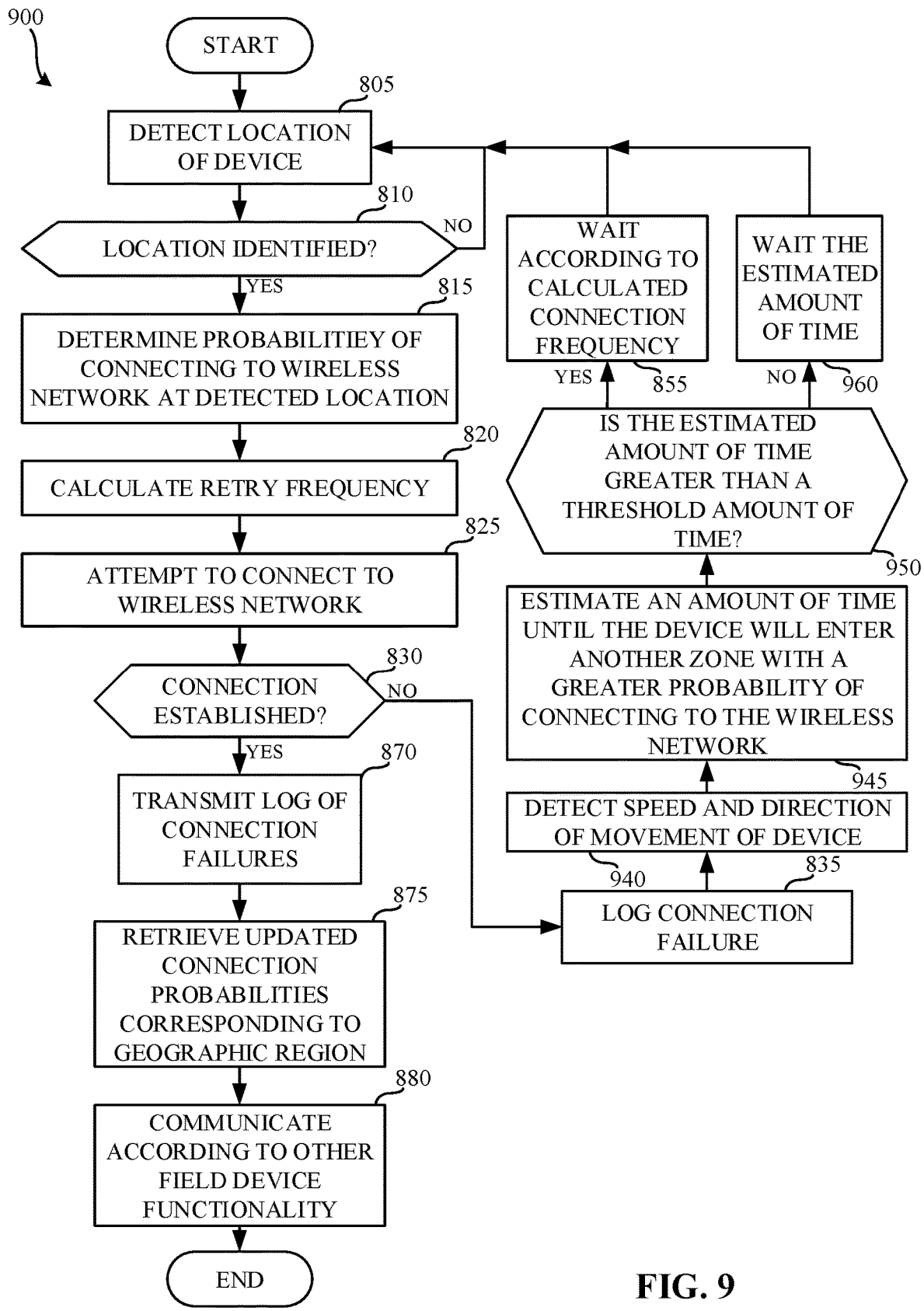
FIG. 9 is a flowchart representative of alternative example machine-readable instructions which, when executed, cause the example field device of FIGS. 1 and/or 3 to attempt to establish a connection and report connection failures to the coverage data processor of FIG. 1.

FIG. 9 is a flowchart representative of alternative example machine-readable instructions 900 which, when executed, cause the example field device 110 of FIGS. 1 and/or 3 to attempt to establish a connection and report connection failures to the coverage data processor 140 of FIG. 1. In some examples, the example field device 110 may determine that it will soon enter another zone with a probability greater than the probability of the current location of the field device 110. That is, in contrast to the example program 800 of FIG. 8, the example program 900 of FIG. 9 utilizes a speed and direction of movement of the field device 110 to determine whether the field device 110 should wait until the field device 110 is expected to enter another zone with a greater probability of establishing a connection.

Beginning with block 830 of FIG. 8, when the example connection processor 350 determines that the connection has not been established (block 830 returns a result of NO), the example connection processor 350 logs the connection failure in the example connection attempt log 360 (block 835). Instead of waiting an amount of time according to the calculated connection frequency (block 855), the example location determiner 320 detects a speed and direction of movement of the field device 110 (block 940).

Using the current location of the device 110 (block 805) and the speed and direction of movement of the field device 110 (block 940), the example frequency determiner 330 estimates an amount of time until the field device 110 will enter another zone with a greater probability of establishing a connection (block 945). In some examples, the estimate of the amount of time until the field device 110 enters the other zone with the greater probability of establishing the connection is based on navigational information (e.g., roads, paths, estimated speeds along those roads/paths, etc.), as the field device 110 might not continue to travel in a straight line and/or at its current speed. In some examples, the example frequency determiner 330 estimates the amount of time until the field device 110 enters a zone having a probability of establishing a connection that is greater than the current probability of establishing a connection (e.g., the probability of the current zone) by more than a threshold percentage difference. In some examples, the threshold percentage is a 20% difference. For example, if the current probability were 5% and the next zone to be entered has a probability of 6%, the example frequency determiner 330 might estimate the amount of time until the example field device 110 reaches a third zone having a probability of 50%.

The example frequency determiner 330 determines whether the estimated amount of time is less than a threshold amount of time (block 950). In the illustrated example of FIG. 9, the example threshold amount of time is one hour. However, any other threshold amount of time may additionally or alternatively be used. Determining whether the estimated amount of time is less than the threshold amount of time ensures that if the field device 110 is stationary or moving slowly, that the field device 110 does not wait an unnecessarily long period of time before attempting to retry establishing a connection. If the estimated amount of time is not less than the threshold (e.g., is greater than or equal to the threshold) (block 950 returns a result of NO), control proceeds to block 855, where the example connection processor 350 waits according to the calculated connection frequency of block 850 (block 855). If the estimated amount of time is less than the threshold amount of time (block 950 returns a result of YES), the example connection processor 350 waits the estimated amount of time (block 960). In some examples, instead of waiting the estimated amount of time, the example connection processor 350 waits a modified estimated amount of time (e.g., the estimated amount of time increased by 10%, the estimated amount of time increased by five minutes, etc.) to account for variations in the speed of the field device 110 and/or the direction of movement of the field device 110. Control then proceeds to block 805, where the process of blocks 805, 810, 815, 820, 825, 830, 835, 940, 945, 950, 855, and/or 960 is repeated until a connection is established (e.g., until block 830 returns a result of YES).

Figure 10:
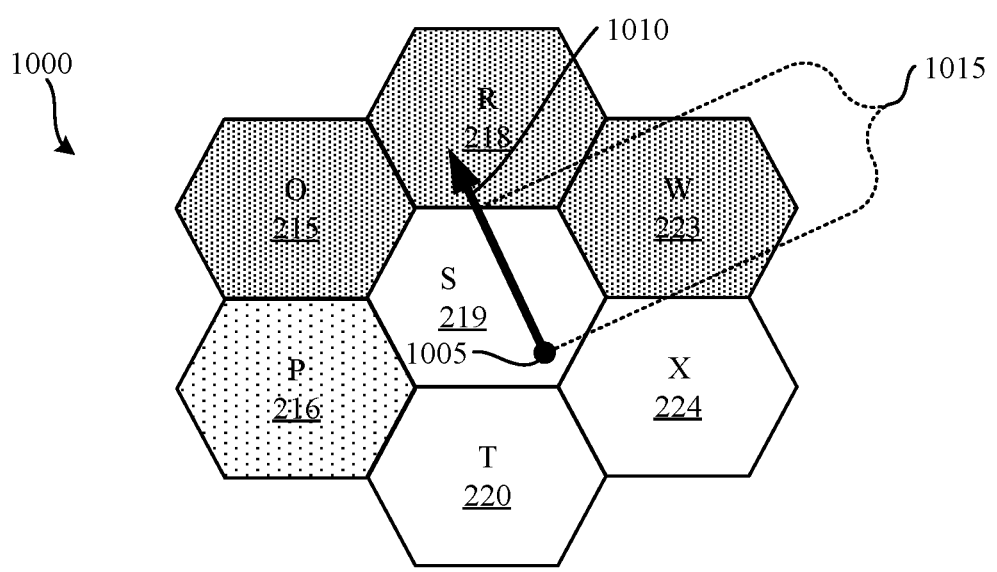
FIG. 10 is an example probability map indicative of probabilities of establishing a connection within a geographic region and showing the field device traveling within the geographic region.

FIG. 10 is an example probability map 1000 indicative of probabilities of establishing a connection within a geographic region and showing the field device 110 traveling within the geographic region. FIG. 10 illustrates a portion of the zones shown in the example probability map 200 of FIG. 2. In particular, FIG. 10 shows zone O 215, zone P 216, zone R 218, zone S 219, zone T 220, zone W 223, and zone X 224. In the illustrated example of FIG. 10, the field device 110 is identified by a dot 1005 and the speed and direction of travel of the field device 110 is identified by the arrow 1010. In the illustrated example of FIG. 10, the field device 110 is shown as presently being in zone S 219 and having a direction of travel towards zone R 218. Zone S 219 has a low probability of a connection being established, while zone R 218 has a high probability of a connection being established. In the illustrated example of FIG. 10, using the current position (the dot 1005) and the direction of travel (the arrow 1010), the example field device 110 determines an estimated distance 1015 until the field device 110 enters zone R 218 (block 945). Using the distance 1015 and the speed at which the field device 110 is moving, an amount of time until the field device 110 enters zone R 218 is estimated. In the illustrated example of FIG. 10, the example field device 110 determines that the field device 110 is expected to enter a zone with a greater probability of establishing a connection in five minutes. As such, because the estimated time until the field device 110 is expected to enter a zone with a greater probability of establishing a connection is less than the threshold amount of time (e.g., in connection with block 950), the example field device 110 waits the estimated amount of time (block 960) until determining whether to re-attempt establishing a connection (blocks 805 and 810 of FIG. 9).

Figure 11:
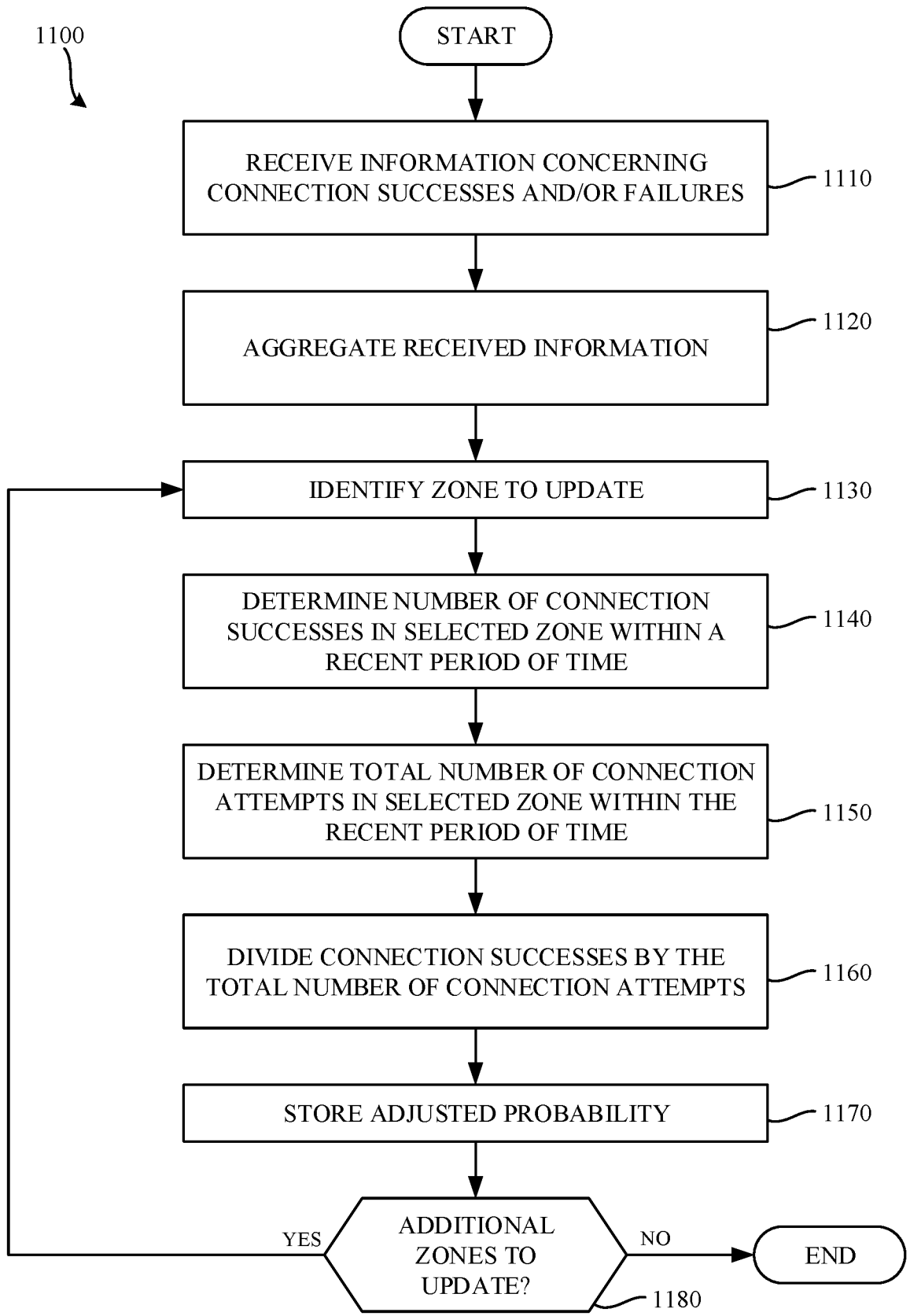
FIG. 11 is a flowchart representative of alternative example machine-readable instructions which, when executed, cause the example coverage data processor to adjust probabilities of establishing a connection based on connection information received from field devices.

FIG. 11 is a flowchart representative of alternative example machine-readable instructions 1100 which, when executed, cause the example coverage data processor 140 to adjust probabilities of establishing a connection based on connection information received from field devices. The example program 1100 of FIG. 11 begins at block 1110 when the example field device interface 440 receives information concerning connection successes and/or failures from the field device 110 (and/or other field devices) (block 1110). In the illustrated example of FIG. 11, the example field device interface 440 receives the log of connection failures from the field device 110. By virtue of having received any communication from the field device 110, the example field device interface 440 assumes that the field device 110 has established a connection at its current location. In some examples, because the field device interface 440 communicate using HTTP, the current location of the field device 110 is indicated to the field device interface 440 using a geolocation header of the HTTP message used to transmit the connection log. However, any other approach to indicating the current location of the field device 110 to the coverage data processor 140 may additionally or alternatively be used. The example field device interface 440 provides the log of connection failures, and the indication of connection success (and the location of the connection success) to the probability determiner 420.

The example probability determiner 420 aggregates connection logs received from the field devices (block 1120). In some examples, the example probability determiner stores success and/or failure indications that are within a threshold period of time (e.g., the last month, the last week, etc.) Records that are outside of the threshold period of time may be deleted, archived, purged, etc. to reduce storage requirements of the coverage data processor 140.

The example probability determiner 420 identifies a zone for which a connection probability is to be updated (block 1130). The example probability determiner 420 reviews the aggregated connection information received from the field devices to determine a number of connection successes within the selected zone and within the threshold period of time (e.g., within the last month, within the last week, etc.) (block 1140). The example probability determiner 420 reviews the aggregated connection information received from the field devices to determine a total number of connection attempts (e.g., connection successes plus connection failures) within the selected zone and within the threshold period of time (e.g., within the last month, within the last week, etc.) (block 1150). As noted above, in some examples, the example probability determiner 420 deletes, archives, purges, etc. records that are outside of the threshold period of time. In such examples, the time filter need not be applied when determining the number of connection successes and/or total number of connection attempts within the selected zone and within the threshold period of time (as such time filter has already been applied by virtue of the deletion, archival, purging, etc. of records outside of the threshold period of time).

The example probability determiner 420 divides the connection successes by the total number of connection attempts to form an adjusted probability (block 1160). In some examples, the probability determiner 420 factors prior probabilities into the adjusted probability to account for the initialized probabilities generated based on the coverage map provided by the carrier 150. In some examples, the carrier 150 may provide an updated coverage map which may be factored into the adjusted probability.

In some examples, instead of filtering by successes and/or failures that occurred within a threshold period of time, the example probability determiner 420 may additionally or alternatively use a threshold number of recent connection attempts and/or failures (e.g., the last one hundred success and/or failure indications, the last one thousand success and/or failure indications, etc.) Such an approach accounts for zones that are not entered frequently (e.g., a zone that did not have any connection attempts in the threshold period of time). This approach also enables larger threshold periods of time to be used (e.g., corresponding to the time period of the last one hundred successes and/or failures, corresponding to the time period of the last one thousand successes and/or failures, etc.), when necessary, to prevent under-sampling. For example, this approach prevents a zone with a previous 5% probability of establishing a connection and having only one recent success and one attempt from being adjusted to a zone with a 100% probability of establishing a connection.

The example probability determiner 420 stores the adjusted probability in the central probability data store 430 in connection with the selected zone (block 1170). As a result, when field devices subsequently request an updated probability map, the adjusted probability is provided. The example probability determiner 420 determines whether any additional zones exist to be updated (block 1180). If additional zones exist (block 1180 returns a result of YES), the example probability determiner 420 identifies the zone (block 1130) and determines the adjusted probability (blocks 1140 through 1170). The process is repeated until all zones have been updated (e.g., until block 1180 returns a result of NO). The example process 1100 of FIG. 11 is then terminated. The example process 1100 may then be repeated periodically and/or aperiodically to adjust the probabilities of establishing a connection within each zone.

While in the illustrated example of FIG. 11, the probability is calculated by dividing the number of connection successes within a zone by the total number of attempts within the zone, any other approach to determining the probability of establishing a connection within a zone may additionally or alternatively be used. For example, a machine learning algorithm may be used to adjust the probability of establishing a connection within a zone may be used. Moreover, in examples where multiple probabilities are calculated for a single zone (e.g., multiple probabilities each corresponding to different wireless communication technologies), the example process 1100 of FIG. 11 may be repeated to account for each of the different probabilities to be calculated for a zone.

Figure 12:
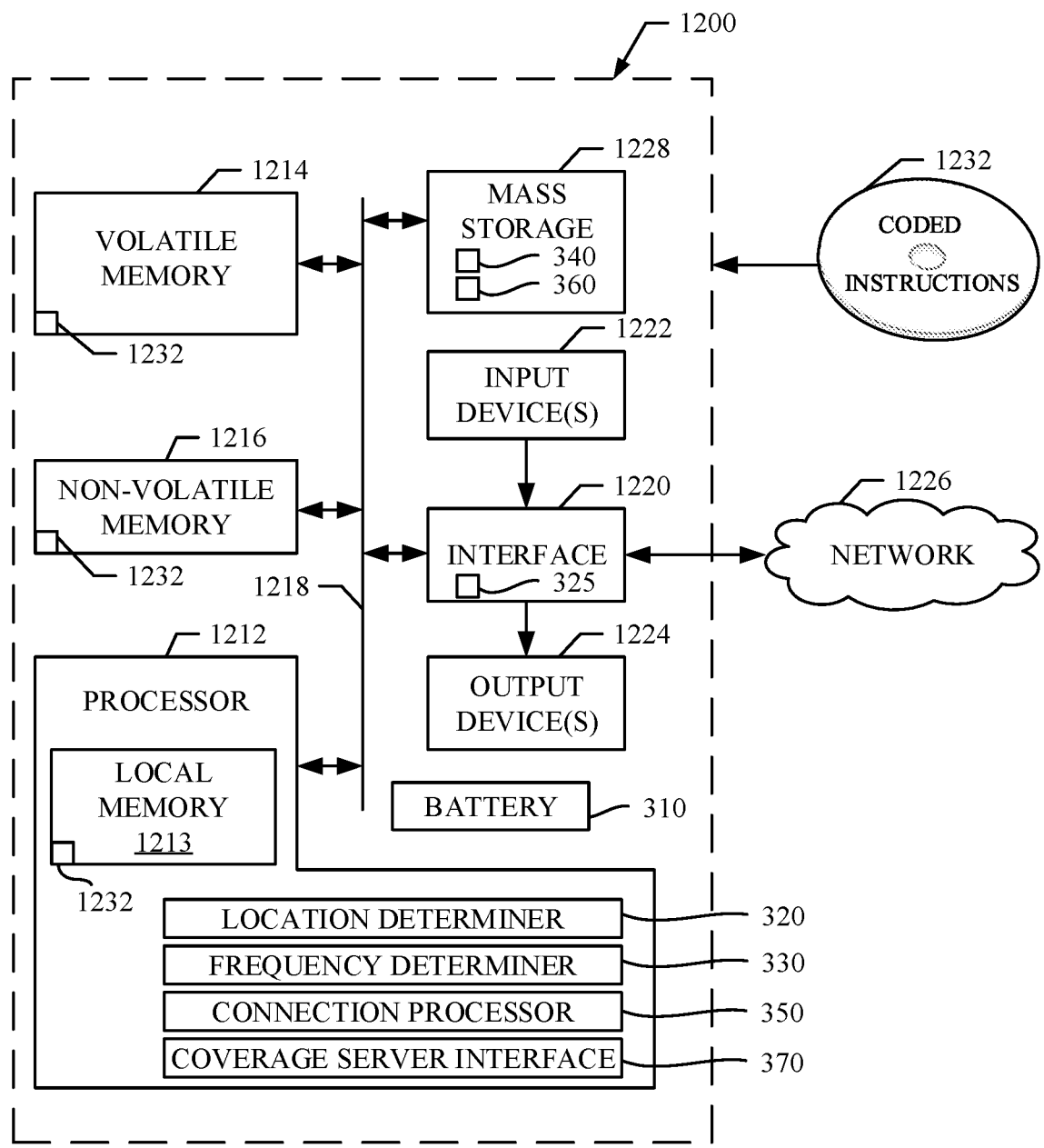
FIG. 12 is a block diagram of an example processor platform 1200 capable of executing the instructions of FIGS. 6, 8, and/or 9 to implement the example field device 110 of FIGS. 1 and/or 3.

FIG. 12 is a block diagram of an example processor platform 1200 capable of executing the instructions of FIGS. 6, 8, and/or 9 to implement the example field device 110 of FIGS. 1 and/or 3. The processor platform 1200 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device. In the illustrated example of FIG. 12, the example processor platform 1200 includes the battery 310. However, in some examples, the battery 310 may be external to the processor platform 1200 and/or may be implemented by any other type of power source.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer.

The processor 1212 of the illustrated example includes a local memory 1213 (e.g., a cache), and executes instructions to implement the example location determiner 320, the example frequency determiner 330, the example connection processor 350, and/or the example coverage server interface 370. The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a PCI express interface.

In the illustrated example, one or more input devices 1222 are connected to the interface circuit 1220. The input device(s) 1222 permit(s) a user to enter data and commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1220 of the illustrated example, thus, typically includes a graphics driver card, a graphics driver chip or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.). The example interface circuit 1220 of the illustrated example of FIG. 12 implements the example wireless communicators 325.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and digital versatile disk (DVD) drives.

The coded instructions 1232 of FIGS. 6, 8, and/or 9 may be stored in the mass storage device 1228, in the volatile memory 1214, in the non-volatile memory 1216, and/or on a removable tangible computer readable storage medium such as a CD or DVD. In the illustrated example of FIG. 12, the example mass storage device 1228 implements the example local probability data store 340 and/or the example connection attempt log 360.

Figure 13:
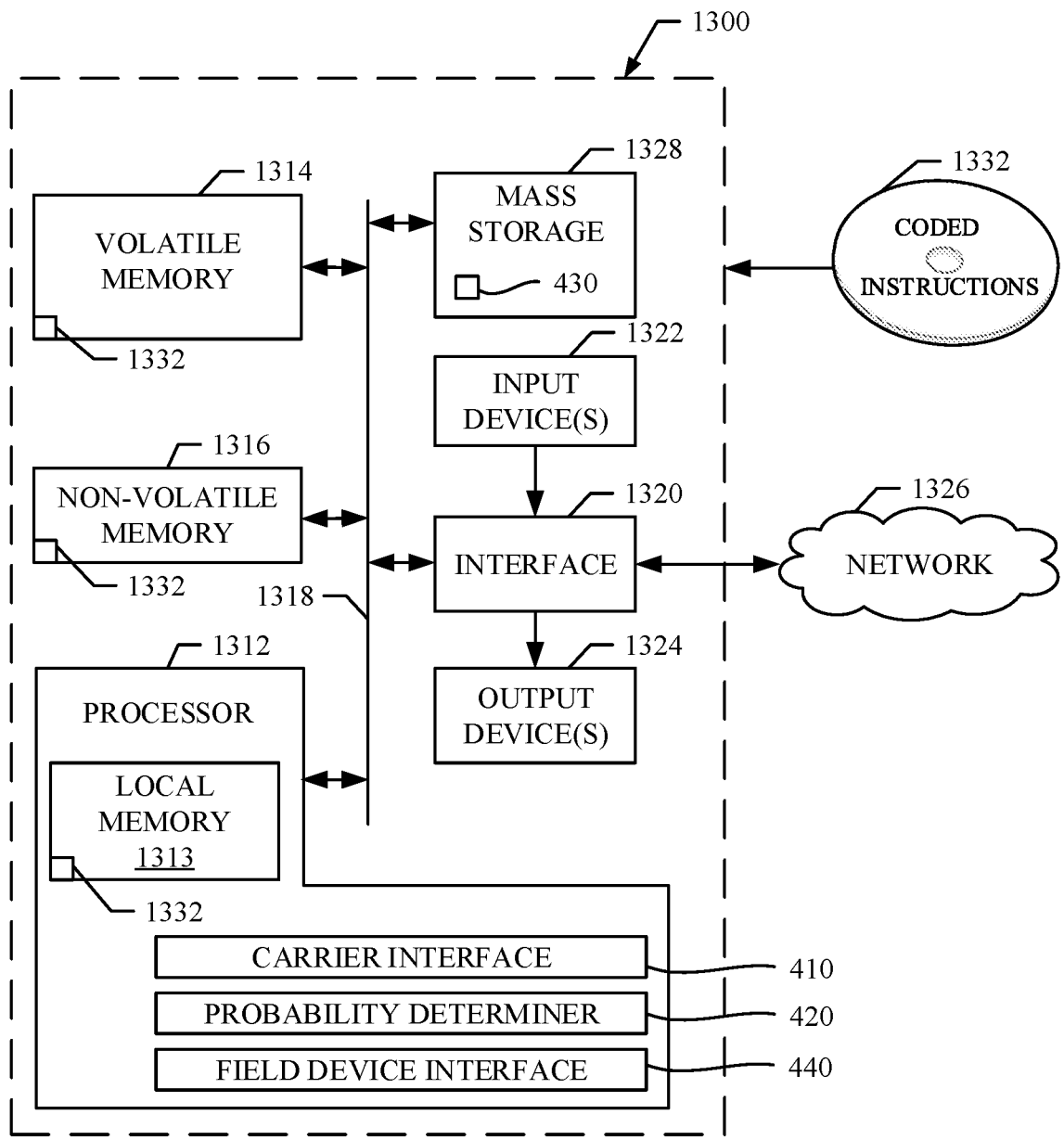
FIG. 13 is a block diagram of an example processor platform 1300 capable of executing the instructions of FIGS. 6, 8, and/or 9 to implement the example field device 110 of FIGS. 1 and/or 3.

FIG. 13 is a block diagram of an example processor platform 1300 capable of executing the instructions of FIGS. 6, 8, and/or 9 to implement the example field device 110 of FIGS. 1 and/or 3. The processor platform 1300 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer.

The processor 1312 of the illustrated example includes a local memory 1313 (e.g., a cache), and executes instructions to implement the example carrier interface 410, the example probability determiner 420, and/or the example field device interface 440. The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1320 of the illustrated example, thus, typically includes a graphics driver card, a graphics driver chip or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.).

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and digital versatile disk (DVD) drives.

The coded instructions 1332 of FIGS. 5 and/or 11 may be stored in the mass storage device 1328, in the volatile memory 1314, in the non-volatile memory 1316, and/or on a removable tangible computer readable storage medium such as a CD or DVD. In the illustrated example of FIG. 13, the example mass storage device 1328 implements the example central probability data store 430.

Figure 14:
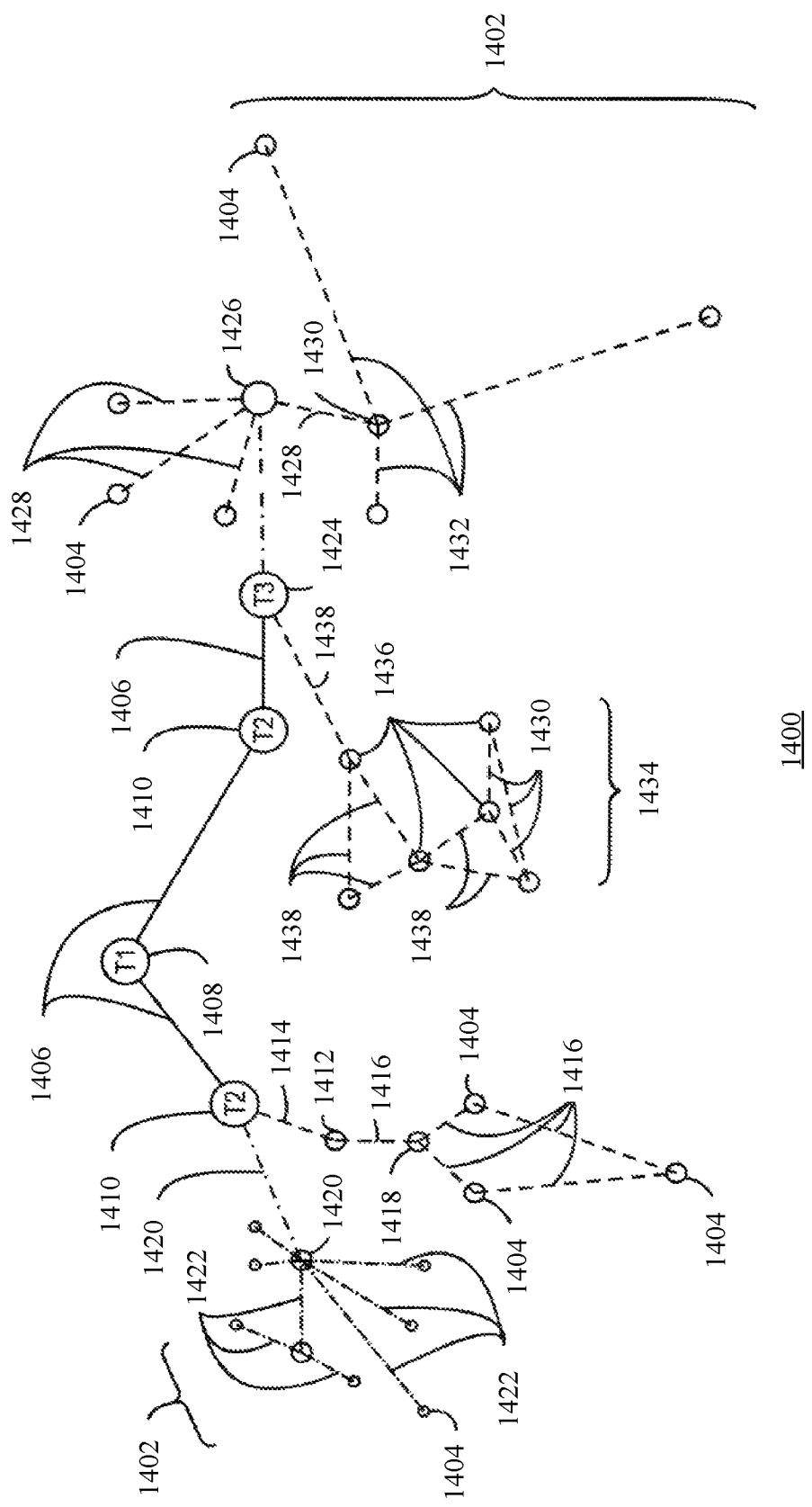
FIG. 14 is a simplified drawing of interconnections that may be present between the Internet and IoT networks.

FIG. 14 is a simplified drawing of interconnections that may be present between the Internet 1400 and IoT networks. The interconnections may couple smaller networks 1402, down to the individual field device(s), to a fiber backbone 1406 of the Internet 1400. To simplify the drawing, not every device 1404, or other object, is labeled. In the illustrated example of FIG. 14, each device 1404 represents an example field device (e.g., the field device 110 of FIGS. 1 and/or 3).

In the simplified drawing, top-level providers, which may be termed tier 1 providers 1408, are coupled by the fiber backbone 1406 of the Internet 1400 to other providers, such as secondary or tier 2 providers 1410. In one example, a tier 2 provider 1410 may couple to a tower 1412 (e.g., a tower implementing the example one or more wireless access points 122, 124 of FIG. 1) of an LTE cellular network, for example, by further fiber links, by microwave communications 1414, or by other communications technologies. The tower 1412 may couple to a mesh network including IoT devices 1404 through an LTE communication link 1416, for example, through a central node 1418. The communications between the individual IoT devices 1404 may also be based on LTE communication links 1416.

In another example, a high-speed uplink 1420 may couple a tier 2 provider 1410 to a gateway 1420. A number of IoT devices 1404 may communicate with the gateway 1420, and with each other through the gateway 1420, for example, over Bluetooth low energy (BLE) links 1422. Thus, in some examples, the IoT devices 1404 (e.g., the field device 110 of FIGS. 1 and/or 3) may communicate with other IoT devices 1404 to, for example, exchange information such as, for example one or more probability maps indicative of probabilities of establishing a connection within a geographic region. Using such an approach, a field device that enters an area without previously storing probability information for that area, may be able to collect information concerning probabilities of establishing a connection with a wireless network in that area from a nearby IoT device without retrieving such information from the coverage data processor 140 (e.g., a centralized server). As a result, sizes of probability maps stored at each IoT device may be reduced, because probabilities might be available from nearby IoT devices 1404 when operating in a region for which such probabilities are not known. Reducing the amount of information stored at the IoT devices 1404 reduces a networking overhead associated with transmitting such information to the IoT devices 1404 as well as reduces memory requirements of the devices 1404.

The fiber backbone 1406 may couple lower levels of service providers to the Internet, such as tier 3 providers 1424. A tier 3 provider 1424 may be considered a general Internet service provider (ISP), for example, purchasing access to the fiber backbone 1410 from a tier 2 provider 1410 and providing access to a corporate gateway 1426 and other customers.

From the corporate gateway 1426, a wireless local area network (WLAN) can be used to communicate with IoT devices 1404 through Wi-Fi® links 1428. A Wi-Fi link 1428 may also be used to couple to a low power wide area (LPWA) gateway 1430, which can communicate with IoT devices 1404 over LPWA links 1432, for example, compatible with the LoRaWan specification promulgated by the LoRa alliance.

The tier 3 provider 1424 may also provide access to a mesh network 1434 through a coordinator device 1436 that communicates with the tier 3 provider 1424 using any number of communications links, such as an LTE cellular link, an LPWA link, or a link 1438 based on the IEEE 802.15.4 standard, such as Zigbee®. Other coordinator devices 1436 may provide a chain of links that forms a cluster tree of linked devices.

It may be clear that each of the IoT devices 1404 include the appropriate transceiver for the communications with that device. Further, each device 1404 may include other transceivers for communications using additional protocols and frequencies, as noted in connection with FIG. 3.

The technologies and networks may enable the exponential growth of devices and networks. As the technologies grows, the network may be developed for self-management, functional evolution, and collaboration, without needing direct human intervention. Thus, the technologies will enable networks to function without centralized controlled systems. The technologies described herein may automate the network management and operation functions beyond current capabilities.

From the foregoing, it will be appreciated that the above disclosed methods, apparatus and articles of manufacture enable field devices to more efficiently use energy stored in a battery. For example, by reducing the number of attempts to establish a connection that a field device will make in locations where such a connection is unlikely, the example field device conserves battery power for use in locations where the connection is more likely. Such an approach reduces a power drain on the device, thereby extending the useful life of the device in the field.

In some examples, the field device reports failed connection attempts, and does not transmit an explicit identification of a connection success. However, the example coverage data processor, by virtue of receiving the indication of the failed connection attempts, can implies that the field device was able to successfully establish a connection. Such an implication reduces the size of a payload as compared to having the field device explicitly report both failed and successful connection attempts. Reducing payload sizes likewise reduces the amount of data to be transmitted by the field devices, thereby extending battery life of the field device. Furthermore, since each field device is transmitting less data, network resources are conserved such that more field devices may be operated in a same area.

Example 1 includes an apparatus to attempt to establish a connection with a wireless network, the apparatus comprising a location determiner to determine a location of the apparatus, a frequency determiner to determine a frequency at which retry attempts to establish a connection with a wireless network are to be made based on the location of the apparatus, a wireless communicator, and a connection processor to cause the wireless communicator to attempt to establish the connection with the wireless network, and, in response to a failure to establish the connection with the wireless network: (1) store an indication of the failure to establish the connection and the location of the apparatus, and (2) wait an amount of time based on the frequency.

Example 2 includes the apparatus as described in example 1, and further includes a coverage server interface to, in response to successfully establishing the connection, transmit the stored indication of the failure to establish the connection and the location of the apparatus to a coverage data processor.

Example 3 includes the apparatus as described in any one of examples 1-2, wherein the frequency determiner is to determine the frequency by identifying a probability of establishing the connection with the wireless network using the location of the apparatus, and identifying the frequency based on the probability of establishing the connection.

Example 4 includes the apparatus as described in any one of examples 1-3, wherein the frequency determiner is to identify the frequency by calculating the frequency using a linear equation.

Example 5 includes the apparatus as described in any one of examples 1-3, wherein the frequency determiner is to identify the frequency by performing a lookup using the probability.

Example 6 includes the apparatus as described in any one of examples 1-3, wherein the frequency determiner is to determine the probability of establishing the connection with the wireless network using a probability map stored in a local probability data store of the apparatus, and further includes a coverage server interface to, in response to successfully establishing the connection, retrieve an updated probability map from a coverage data processor.

Example 7 includes the apparatus as described in example 6, wherein the coverage server interface is further to, in response to successfully establishing the connection, transmit a log of connection failures to the coverage data processor, the log of connection failures including the stored indication of the failure to establish the connection and the location of the apparatus, the probability map retrieved from the coverage data processor is created by the coverage data processor using the log of connection failures.

Example 8 includes the apparatus as described in any one of examples 1-7, wherein the location determiner is to use dead reckoning to identify the location of the apparatus.

Example 9 includes a method to attempt to establish a connection with a wireless network, the method comprising determining a location of a field device, determining a frequency at which retry attempts to establish the connection with the wireless network are to be made based on the location of the field device, attempting to establish the connection with the wireless network, and in response to a failure to establish the connection with the wireless network: storing an indication of the failure to establish the connection and the location of the field device, and waiting an amount of time based on the frequency.

Example 10 includes the method as described in example 9, and further includes, in response to successfully establishing the connection, transmitting the stored indication of the failure to establish the connection and the location of the field device to a coverage data processor.

Example 11 includes the method as described in any one of examples 9-10, wherein the determining of the frequency includes identifying a probability of establishing the connection with the wireless network using the location of the field device, and determining the frequency based on the probability of establishing the connection.

Example 12 includes the method as described in any one of examples 9-11, wherein the determining of the frequency based on the probability includes calculating the frequency using a linear equation.

Example 13 includes the method as described in any one of examples 9-11, wherein the determining of the frequency based on the probability includes performing a lookup using the probability.

Example 14 includes the method as described i in any one of examples 9-11, wherein the probability of establishing the connection with the wireless network using the location of the field device is determined using a probability map stored in a local probability data store of the field device, and further includes in response to successfully establishing the connection, retrieving an updated probability map from a coverage data processor.

Example 15 includes the method as described in example 14, and further includes, in response to successfully establishing the connection, transmitting a log of connection failures to the coverage data processor, the log of connection failures including the stored indication of the failure to establish the connection and the location of the field device, wherein the probability map retrieved from the coverage data processor is created by the coverage data processor using the log of connection failures.

Example 16 includes the method as described in any one of examples 9-15, wherein the location of the field device is determined using dead reckoning.

Example 17 includes a non-transitory computer readable medium comprising instructions which, when executed, cause a field device to at least determine a location of a field device, determine a frequency at which retry attempts to establish a connection with a wireless network are to be made based on the location of the field device, attempt to establish the connection with the wireless network, and in response to a failure to establish the connection with the wireless network: store an indication of the failure to establish the connection and the location of the field device, and wait an amount of time based on the frequency.

Example 18 includes the non-transitory computer readable medium as described in example 17, wherein the instructions, when executed, further cause the field device to, in response to successfully establishing the connection, transmit the stored indication of the failure to establish the connection and the location of the field device to a coverage data processor.

Example 19 includes the non-transitory computer readable medium as described in any one of examples 17-18, and further includes instructions which, when executed, cause the field device to identify a probability of establishing the connection with the wireless network using the current location of the field device, and determine the frequency based on the probability of establishing the connection.

Example 20 includes the non-transitory computer readable medium as described in any one of examples 17-19, wherein the determining of the frequency based on the probability includes calculating the frequency using a linear equation.

Example 21 includes the non-transitory computer readable medium as described in any one of examples 17-19, wherein the determining of the frequency based on the probability includes performing a lookup using the probability.

Example 22 includes the non-transitory computer readable medium as described in any one of examples 17-19, wherein the probability of establishing the connection with the wireless network using the location of the field device is determined using a probability map stored in a local probability data store of the field device, and wherein the instructions, when executed, further cause the field device to, in response to successfully establishing the connection, retrieve an updated probability map from a coverage data processor.

Example 23 includes the non-transitory computer readable medium as described in example 22, wherein the instructions, when executed, further cause the field device to, in response to successfully establishing the connection, transmit a log of connection failures to the coverage data processor, the log of connection failures including the stored indication of the failure to establish the connection and the location of the field device, the probability map retrieved from the coverage data processor is created by the coverage data processor using the log of connection failures.

Example 24 includes the non-transitory computer readable medium as described in any one of examples 17-24, wherein the location of the field device is determined using dead reckoning.

Example 25 includes an apparatus to attempt to establish a connection with a wireless network, the apparatus comprising means for determining a location of a field device, means for determining a frequency at which retry attempts to establish the connection with the wireless network are to be made based on the location of the field device, means for attempting to establish the connection with the wireless network, and means for storing an indication of a failure to establish the connection and the location of the field device in response to the failure to establish the connection with the wireless network; and means for waiting an amount of time based on the frequency in response to the failure to establish the connection with the wireless network.

Example 26 includes the apparatus as described in example 25, and further includes means for transmitting, in response to successfully establishing the connection, the stored indication of the failure to establish the connection and the location of the field device to a coverage data processor.

Example 27 includes the apparatus as described in any one of examples 25-26, wherein the determining of the frequency includes identifying a probability of establishing the connection with the wireless network using the location of the field device, and determining the frequency based on the probability of establishing the connection.

Example 28 includes the apparatus as described in any one of examples 25-27, wherein the determining of the frequency based on the probability includes calculating the frequency using a linear equation.

Example 29 includes the apparatus as described in any one of examples 25-27, wherein the determining of the frequency based on the probability includes performing a lookup using the probability.

Example 30 includes the apparatus as described in any one of examples 25-27, wherein the probability of establishing the connection with the wireless network using the location of the field device is determined using a probability map stored in a local probability data store of the field device, and further includes means for retrieving, in response to successfully establishing the connection, an updated probability map from a coverage data processor.

Example 31 includes the apparatus as described in example 30, and further includes means for transmitting, in response to successfully establishing the connection, a log of connection failures to the coverage data processor, the log of connection failures including the stored indication of the failure to establish the connection and the location of the field device, wherein the probability map retrieved from the coverage data processor is created by the coverage data processor using the log of connection failures.

Example 32 includes the apparatus as described in any one of examples 25-32, wherein the location of the field device is determined using dead reckoning.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to attempt to establish a connection with a wireless network, the apparatus comprising:
 a location determiner to determine a location of the apparatus as being within a first zone;
 a frequency determiner to determine a frequency at which retry attempts to establish a connection with a wireless network are to be made based on the location of the apparatus in the first zone and a first probability of connecting to the wireless network;
 a wireless communicator; and
 a connection processor to cause the wireless communicator to attempt to establish the connection with the wireless network, and, in response to a failure to establish the connection with the wireless network:
   (1) store an indication of the failure to establish the connection and the location of the apparatus;
   (2) select a second zone adjacent to the first zone and having a second probability of connecting to the wireless network greater than the first probability of connecting to the wireless network;
   (3) in response to determining that a difference between the second probability and the first probability is not greater than a threshold difference, select a third zone adjacent to the second zone and having a third probability of connecting to the wireless network greater than the first probability plus the threshold difference;

(4) calculate an estimated amount of time until the apparatus will enter the third zone, the estimated amount of time based on the location of the apparatus and a speed and direction of movement of the apparatus; and (5) wait an amount of time based on at least one of the estimated amount of time or the frequency.

2. The apparatus as described in claim 1, further including a coverage server interface to, in response to successfully establishing the connection, transmit the stored indication of the failure to establish the connection and the location of the apparatus to a coverage data processor.

3. The apparatus as described in claim 1, wherein the frequency determiner is to determine the frequency by identifying the first probability of establishing the connection with the wireless network using the location of the apparatus.

4. The apparatus as described in claim 3, wherein the frequency determiner is to identify the frequency by calculating the frequency using a linear equation.

5. The apparatus as described in claim 3, wherein the frequency determiner is to identify the frequency by performing a lookup using the first probability.

6. The apparatus as described in claim 3, wherein the frequency determiner is to determine the first probability of establishing the connection with the wireless network using a probability map stored in a local probability data store of the apparatus, and further including:

a coverage server interface to, in response to successfully establishing the connection, retrieve an updated probability map from a coverage data processor.

7. The apparatus as described in claim 6, wherein the coverage server interface is further to, in response to successfully establishing the connection, transmit a log of connection failures to the coverage data processor, the log of connection failures including the stored indication of the failure to establish the connection and the location of the apparatus, the probability map retrieved from the coverage data processor is created by the coverage data processor using the log of connection failures.

8. The apparatus as described in claim 1, wherein the location determiner is to use dead reckoning to identify the location of the apparatus.

9. A method to attempt to establish a connection with a wireless network, the method comprising:

determining a location of a field device as being within a first zone;

determining a frequency at which retry attempts to establish the connection with the wireless network are to be made based on the location of the field device in the first zone and a first probability of connecting to the wireless network;

attempting to establish the connection with the wireless network; and in response to a failure to establish the connection with the wireless network:

storing an indication of the failure to establish the connection and the location of the field device;

determining a speed and a direction of movement of the field device;

selecting a second zone adjacent to the first zone and having a second probability of connecting to the wireless network, the second probability greater than the first probability of connecting to the wireless network;

in response to determining that a difference between the second probability and the first probability is not greater than a threshold difference, selecting a third zone adjacent to the second zone and having a third probability of connecting to the wireless network greater than the first probability plus the threshold difference;

calculating an estimated amount of time until the field device will enter the third zone, the estimated amount of time based on the location of the field device and the speed and direction of movement of the field device; and waiting an amount of time based on at least one of the estimated amount of time or the frequency.

10. The method as described in claim 9, further including, in response to successfully establishing the connection, transmitting the stored indication of the failure to establish the connection and the location of the field device to a coverage data processor.

11. The method as described in claim 9, wherein the determining of the frequency includes identifying the first probability of establishing the connection with the wireless network using the location of the field device.

12. The method as described in claim 11, wherein the determining of the frequency based on the first probability includes performing a lookup using the first probability.

13. The method as described in claim 11, further including:

determining the first probability of establishing the connection with the wireless network using a probability map stored in a local probability data store of the field device and:

in response to successfully establishing the connection, retrieving an updated probability map from a coverage data processor.

14. The method as described in claim 13, further including, in response to successfully establishing the connection, transmitting a log of connection failures to the coverage data processor, the log of connection failures including the stored indication of the failure to establish the connection and the location of the field device, wherein the probability map retrieved from the coverage data processor is created by the coverage data processor using the log of connection failures.

15. The method as described in claim 9, wherein the location of the field device is determined using dead reckoning.

16. A non-transitory computer readable medium comprising instructions which, when executed, cause a field device to at least:

determine a current location of the field device as being within a first zone;

determine a frequency at which retry attempts to establish a connection with a wireless network are to be made based on the current location of the field device in the first zone and a first probability of connecting to the wireless network from the current location;

attempt to establish the connection with the wireless network; and in response to a failure to establish the connection with the wireless network:

store an indication of the failure to establish the connection and the location of the field device;

determine a speed and a direction of movement of the field device;

select a second zone adjacent to the first zone and having a second probability of connecting to the wireless network, the second probability greater than the first probability of connecting to the wireless network;

in response to determining that a difference between the second probability and the first probability is not greater than a threshold difference, select a third zone adjacent to the second zone and having a third probability of connecting to the wireless network greater than the first probability plus the threshold difference;

calculate an estimated amount of time until the field device will enter the third zone, the estimated amount of time based on the location of the field device and the speed and direction of movement of the field device; and wait an amount of time based on at least one of the estimated amount of time or the frequency.

17. The non-transitory computer readable medium as described in claim 16, wherein the instructions, when executed, further cause the field device to, in response to successfully establishing the connection, transmit the stored indication of the failure to establish the connection and the location of the field device to a coverage data processor.

18. The non-transitory computer readable medium as described in claim 16, further including instructions which, when executed, cause the field device to identify the first probability of establishing the connection with the wireless network using the current location of the field device.

19. The non-transitory computer readable medium as described in claim 18, wherein the instructions, when executed, cause the field device to determine of the frequency based on the first probability by calculating the frequency using a linear equation.

20. The non-transitory computer readable medium as described in claim 18, wherein the instructions, when executed, cause the field device to determine the frequency based on the first probability by performing a lookup using the first probability.

21. The non-transitory computer readable medium as described in claim 18, wherein the instructions, when executed, cause the field device to:

determine the first probability of establishing the connection with the wireless network using the location of the field device using a probability map stored in a local probability data store of the field device; and in response to successfully establishing the connection, retrieve an updated probability map from a coverage data processor.

22. The non-transitory computer readable medium as described in claim 21, wherein the instructions, when executed, further cause the field device to, in response to successfully establishing the connection, transmit a log of connection failures to the coverage data processor, the log of connection failures including the stored indication of the failure to establish the connection and the location of the field device, the probability map retrieved from the coverage data processor is created by the coverage data processor using the log of connection failures.

23. The non-transitory computer readable medium as described in claim 16, wherein instructions, when executed, cause the field device to determine the location of the field device using dead reckoning.

24. The non-transitory computer readable medium as described in claim 16, wherein the instructions, when executed, cause the field device to at least:

determine whether the estimated amount of time is greater than a threshold amount of time;

in response to determining that the estimated amount of time is greater than the threshold amount of time, wait the amount of time based on the frequency; and in response to determining that the estimated amount of time is not greater than the threshold amount of time, wait the amount of time based on the estimated amount of time.

\* \* \* \* \*